United States Patent [19]

Tabata et al.

[11] Patent Number: 6,014,668

[45] Date of Patent: *Jan. 11, 2000

[54] DOCUMENT INFORMATION MANAGEMENT SYSTEM AND METHOD OF GENERATING A HUMAN-COMPUTER INTERACTIVE DOCUMENT SHEET ALLOWING RELEVANT INFORMATION RETRIEVAL FROM A REMOTE SITE

[75] Inventors: Yasuhiro Tabata, Yokohama; Takashi Yano, Tokyo-to; Hisashi Ishijima, Yokohama, all of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/946,670

[22] Filed: Oct. 7, 1997

[30] Foreign Application Priority Data

Oct. 7, 1996 [JP] Japan ................................. 8-266433

[51] Int. Cl.⁷ .................................................. G06F 17/30
[52] U.S. Cl. .............................. 707/10; 707/3; 707/104
[58] Field of Search ................................. 707/3, 10, 104, 707/200, 505, 507, 522; 364/400; 395/200.47, 200.33; 379/100; 358/402, 403, 400

[56] References Cited

U.S. PATENT DOCUMENTS

| | | | |
|---|---|---|---|
| 4,893,333 | 1/1990 | Baran et al. ............................. | 379/100 |
| 4,903,229 | 2/1990 | Schmidt et al. ......................... | 707/200 |
| 5,231,510 | 7/1993 | Worthington ........................... | 358/400 |
| 5,315,504 | 5/1994 | Lemble .................................. | 364/400 |
| 5,357,345 | 10/1994 | Nakano et al. ......................... | 358/403 |
| 5,410,646 | 4/1995 | Tondevold et al. .................... | 707/507 |
| 5,644,404 | 7/1997 | Hashimoto ............................. | 358/402 |
| 5,682,540 | 10/1997 | Klotz, Jr. et al. ....................... | 707/505 |
| 5,704,029 | 12/1997 | Wright, Jr. ............................. | 707/505 |
| 5,784,562 | 7/1998 | Diener ................................. | 395/200.47 |
| 5,835,712 | 11/1998 | DuFresne ............................. | 395/200.33 |
| 5,860,073 | 1/1999 | Ferrel et al. ............................ | 707/522 |
| 5,864,871 | 1/1999 | Kitain et al. ............................ | 707/104 |
| 5,873,077 | 2/1999 | Kanoh et al. ............................ | 707/3 |

*Primary Examiner*—Wayne Amsbury
*Assistant Examiner*—Thuy Pardo
*Attorney, Agent, or Firm*—Oblon, Spivak, McClelland, Maier & Neustadt, P.C.

[57] ABSTRACT

Document information management system capable of generating human/computer interactive document sheets that allow relevant information retrieval at user remote sites. A file server stores a plurality of source data files related to respectively corresponding information components. A sheet-formed information medium is provided on which document objects including the information components, link information for linking a source data file with a corresponding information component, and selecting information for selecting arbitrary information components are recorded. A control terminal apparatus is connected to the file server and includes a communication function and a retrieval function for retrieving a desired file stored in the file server. At least one remote terminal apparatus is capable of reading the sheet-formed information medium, receiving data from and transmitting data to the control terminal apparatus, and producing a document received from the control terminal apparatus on a recording sheet. Upon receiving the selecting information and the link information included in the transmitted data of the sheet-formed information medium from the remote terminal apparatus, the control terminal apparatus retrieves a corresponding source data file stored in the file server by use of the selecting information and the link information, and transmits the corresponding source data file to the at remote terminal apparatus. The remote terminal apparatus can produce a document that includes the corresponding source data file on a recording sheet.

36 Claims, 18 Drawing Sheets

TABLE 1

| NAME | DICON | | |
|---|---|---|---|
| | DATA FORM | CONTENTS | SOURCE DATA FILE |
| TITLE DICON 205 | TEXT | TITLE | DOCUMENT |
| TEXT DICON 202 | TEXT | REFERENCE<br>ABSTRACT<br>WORD<br>PERSONNEL NAME | DOCUMENT<br>WHOLE DOCUMENT<br>WORD EXPLANATION<br>PROFILE |
| SYMBOL DICON 203 | GRAPHIC IMAGE | SYMBOL MARK<br>DOCUMENT MARK | DOCUMENT<br>DOCUMENT |
| GRAPHIC DICON 204 | GRAPHIC IMAGE | SIZE-REDUCED IMAGE<br>MONOCHROME IMAGE<br>DITHER IMAGE | FULL-SIZED IMAGE<br>COLOR IMAGE<br>GRAY-SCALE IMAGE |

FIG. 5

TABLE 2

| LOCATOR-1 | LOCATOR-2 |
|---|---|
| 01 | 002002 |
| 02 | 004588 |
| 03 | 003224 |
| 04 | 009896 |
| 05 | 001124 |
| – | – |
| – | – |
| – | – |
| – | – |
| 10 | 006520 |

*FIG. 9*

TABLE 3

| LOCATOR-1 | DICON ID |
|---|---|
| 01 | 001325 |
| 02 | 001911 |
| 03 | 001326 |
| 04 | 001328 |
| 05 | 003002 |
| – | – |
| – | – |
| – | – |
| – | – |
| 10 | 005014 |

*FIG. 10A*

TABLE 4

| LOCATOR-1 | LOCATOR-2 |
|---|---|
| 001325 | 002002 |
| 001911 | 004588 |
| 001326 | 003224 |
| 001328 | 009896 |
| 003002 | 001124 |
| – | – |
| – | – |
| – | – |
| – | – |
| 005014 | 006520 |

*FIG. 10B*

DOCUMENT INFORMATION MANAGEMENT SYSTEM AND METHOD OF GENERATING A HUMAN-COMPUTER INTERACTIVE DOCUMENT SHEET ALLOWING RELEVANT INFORMATION RETRIEVAL FROM A REMOTE SITE

BACKGROUND OF THE INVENTION

1. Field of the Invention

The present invention relates to a method and system for document information management, and more particularly to a method and system for document information management which is capable of generating a human-computer interactive document sheet which allows a user to retrieve relevant information at a remote site.

2. Discussion of the Background

A so-called paper-less office is one recent rapid-growing trend in an office environment in which various computer-based systems for document information management have been improved to increase efficiency and productivity of office tasks that handle a considerable amount of document information. The paper-less office is resulting from recent advancements in computer and human-computer interface technologies as well as in computer networking, and generally indicates a phenomenon that conventional paper-based documents are being replaced with electronically generated documents on computers.

A conventional paper document and an electronic document are two different forms of a document; one printed and the other electronized. It is obvious that the electronic document has many advantages. Firstly, it is easy to create an electronic document on a computer. Secondly, the electronic document can easily be corrected, filed, copied, generated on demand on a recording sheet, and so forth. To do this, a variety of convenient document processing functions have been developed. On top of it, a great advantage that accelerates the paper-less office trend is the capability of data transmission via computer networking lines, by which the document can be transmitted to other locations without having to be reproduced.

However, the electronic document also has crucial disadvantages despite its ease of use. Disadvantages lay in a lack of connectivity to actual office practices which normally proceed with the paper document, a lack of portability to any place where there is no computer, and so on. In many cases, the electronic document is reproduced on a recording sheet to be used for actual office practices. Therefore, both the electronic document and the paper document inevitably need to coexist and may selectively be used depending upon the requirements of the actual office practices.

However, the above-mentioned differences between the electronic document and the paper document result in the following problems.

Once an electronic document, generated and controlled in a sophisticated document information management system, has been output on a recording sheet, the paper document loses linkage to all the advantageous information such as address information, security information such as a password, link information to other documents, and so on. Since the paper document has no direct bridge to the electronic data, a user needs to use a data entry unit such as a keyboard to access the data. A hyper text, which is explained below, also loses its advantageous information when it is output on a recording sheet.

Hyper text is a well known concept of a multimedia software and includes a plurality of electronic texts that are arranged in a hierarchical structure and linked to each other; each one of the texts can be referred to in an arbitrary order through the link structure. The hyper text includes normal text information and information for linkage. When output on the recording sheet, the hyper text loses the information for linkage and is no longer a hyper text. The hyper text is a concept effective only within the electronized document on computer, and there is no idea of such a hyper text that can be effective on a recording sheet.

Japanese Patent Publication number 09-091301 (1997) discloses a document information management system which generates a human-computer interactive document sheet that can bidirectionally communicate with human and computer.

There are several ways to access and to output an electronic document. As an example, a widely practiced way on the computer is opening a window for a list of documents that are stored in the file server, for example, finding a desired document on the list, clicking the desired document, and then the desired document is output on a recording sheet. Another example is to use a search program for searching for a desired document by a key word, for example.

These ways to access and to output an electronic document require a computer at the user site. However, there is a desire to access and to output an electronic document without a computer at the user site.

To respond to this desire, an apparatus including an electronic filing function, a facsimile data transmission function, and a document token generator has been developed. In this apparatus, when storing a document using the electronic filing function, all the pages of the document are printed out in a reduced-size image into an at-a-glance chart which is called a token, so that one can easily mark a desired page on the chart for selection. The chart with the mark is then read by the apparatus and the desired page is retrieved.

Although this apparatus makes it possible to access the computer files using a paper document, a problem is on the chart itself; the chart is a kind of dedicated mark sheet and can not be used for a plain document in general. Further, this apparatus has several inconveniences in use. For example, to obtain a document token, complicated operations are required by a user. As another example, this apparatus can retrieve the document only in units of pages but not in units of words, sentences, and so forth. Moreover, this apparatus requires more paper of the tokens to keep in addition to the pile of normal document paper.

Further, there has been developed a technique for information security in which a user is required to write a password on a sheet; the password is then checked and it is determined if the user has a right to access. However, this information security has a problem; a password needs to be hidden normally but it is on the sheet in this case.

As mentioned above, the document information management system disclosed by Japanese Patent Publication number 09-091301 (1997) generates a human-computer interactive document sheet that can bidirectionally communicate with human and computer. However, this system has no way of retrieving an information file by a user from a remote site using a popular telecommunication apparatus such as a facsimile apparatus, for example.

SUMMARY OF THE INVENTION

Accordingly, an object of the present invention is to provide a novel document information management system which is capable of generating a human-computer interactive document sheet that allows relevant information retrieval by a user at remote sites.

Another object of the present invention is to provide a novel document information management system which eliminates a need of a dedicated mark sheet and allows relevant information retrieval by a user at remote sites.

Another object of the present invention is to provide a novel document information management system which includes a user identification check function for information security in which the user identification is handled in a confidential way.

To achieve the above-mentioned and other objects, the document information management system includes a file server for storing a plurality of source data files related to respectively corresponding information components each including at least one of at least a word, sentence, symbol, and graphic image, and a sheet-formed information medium on which document objects including the information components, link information for linking a source data file with a corresponding information component, selecting information for selecting arbitrary information components are recorded.

The above-mentioned document information management system further includes a control terminal apparatus connected to the file server and including a communication function and a retrieval function for retrieving a desired file stored in the file server, and at least one remote terminal apparatus capable of reading the sheet-formed information medium, receiving data from and transmitting data to the control terminal apparatus, and producing a document received from the control terminal apparatus on a recording sheet. Upon receiving the selecting information and the link information included in the transmitted data of the sheet-formed information medium from the remote terminal apparatus, the control terminal apparatus of the above-mentioned document information management system retrieves a corresponding source data file stored in the file server by use of the selecting information and the link information, and transmits the corresponding source data file to the remote terminal apparatus, and then the remote terminal apparatus can produce a document that includes the corresponding source data file on a recording sheet.

The above-mentioned remote terminal apparatus may preferably transmit only the selecting information and the linking information when transmitting the read information of the sheet-formed information medium to the control terminal apparatus, so as to shorten data transmission time.

The above-mentioned document information management system may include a user identification verifying function by having registered user names stored in the file server or in the control terminal apparatus and having the user identification information recorded on the sheet-formed information medium or input from the remote terminal apparatus.

A facsimile machine may be used as the remote terminal apparatus of the above-mentioned document information management system.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a table showing relationships of contents between the DICON and the source data file;

FIG. 9 is a table for explaining one type of a LINK;

FIGS. 10(a) and 10(b) are tables for explaining another type of the LINK;

DESCRIPTION OF THE PREFERRED EMBODIMENTS

Figure 1:
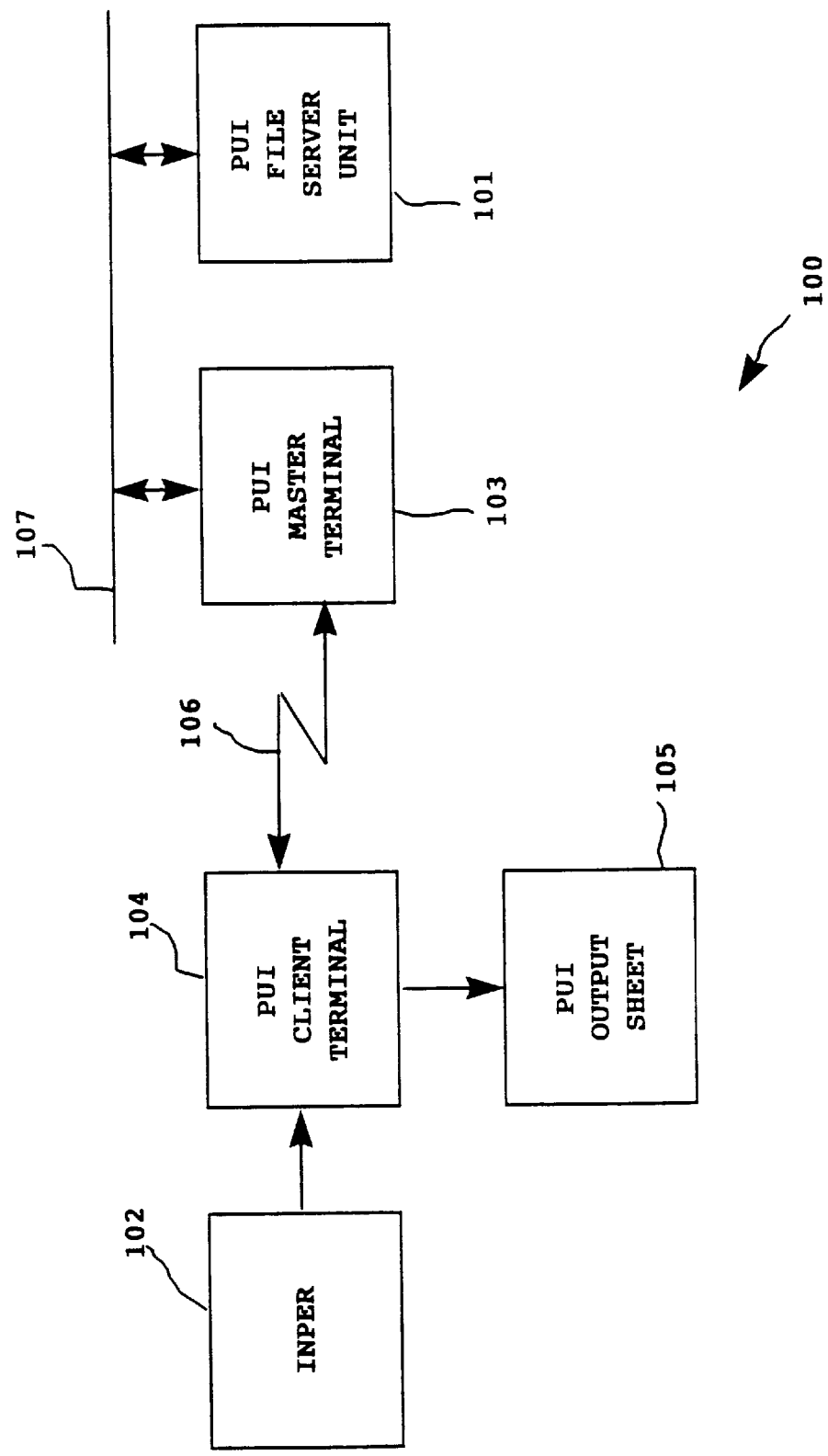
FIG. 1 is a block diagram of an embodiment of a PUI (paper-user interactive) document information management system according to the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, a block diagram of a novel PUI (paper-user interactive) document information management system 100 as an embodiment of the present invention is illustrated.

The PUI document information management system 100 shown in FIG. 1 includes a PUI (paper-user interactive) file server unit 101, an INPER (interactive paper) 102, a PUI (paper-user interactive) master terminal apparatus 103, and a PUI client terminal apparatus 104. The PUI file server unit 101 stores a plurality of source data files. Each one of the source data file includes an amount of detailed information in relation to a specific information component composed of at least a word, a sentence, a symbol, or a graphic image, for example, and is referred to as a DICON (document icon).

The INPER 102 is a sheet-like information medium on which information arranged for the PUI document information management system 100 is recorded. A main body of the information recorded on the INPER 102 is topic information referred to as a TOPIC. The INPER 102 has at least one TOPIC thereon. A TOPIC is made of at least a word, a sentence, a symbol, or a graphic image, and includes at least one DICON including at least a word, a sentence, a symbol, or a graphic image, for example. There is further information on the INPER 102 other than the TOPIC, referred to as a LINK and a SELECTOR. The LINK links the TOPICs with the source data files stored in the PUI file server unit 101 of the PUI document management system 100. The SELECTOR selects an arbitrary DICON in the TOPIC of the INPER 102.

The PUI master terminal apparatus 103 includes a data and facsimile data transmission function for receiving and transmitting data and facsimile data over a telephone line and a file retrieving function for retrieving data and facsimile data of an arbitrary source data file from among the plurality of source data files stored in the PUI file server unit 101. The PUI client terminal apparatus 104 receives and transmits data and facsimile data over a telephone line 106, and can also produce a PUI output sheet 105 on which contents of a source file from the PUI file server unit 101 are recorded. The PUI client terminal apparatus 104 may be a normal facsimile apparatus. The PUI master terminal apparatus 103 is connected to the PUI file server unit 101 through a computer network 107, for example, and to the PUI client terminal apparatus 104 over a telephone line 106.

As mentioned above, the PUI file server unit 101 stores a plurality of source data files, each one of which includes an amount of detailed information in relation to a corresponding DICON including at least a word, a sentence, a symbol, or a graphic image, for example. Therefore, any DICON in the TOPIC on the INPER 102 can be linked with the corresponding source data file and, reversely, any one of the source data files can be searched, by handling the DICON as a sort of key word.

The DICONs are generally placed at arbitrary locations in the TOPICs on the INPER 102. A desired DICON can be selected from among a plurality of the DICONs in the TOPICs using the SELECTOR. Then, the selected DICON can be linked with a corresponding source data file stored in the PUI file server unit 101 using the LINK.

More specifically, the LINK includes a set of first location information (hereinafter referred to as a LOCATOR-1) for representing a location of the DICON in the INPER 102 and second location information (hereinafter referred to as a LOCATOR-2) for representing an address of the corresponding source data file in the PUI file server unit 101. Alternatively, the LINK may include a set of the above-mentioned first location information (LOCATOR-1) and DICON identification information (hereinafter referred to as a DICON ID) for identifying a specific DICON positioned at a location indicated by the LOCATOR-1 of the LINK.

The SELECTOR selects a DICON from among a plurality of the DICONs in the TOPICs on the INPER 102. Then, a LOCATOR-1 is specified on the basis of the location of the selected DICON. Then, the LINK of the LOCATOR-1 automatically links the LOCATOR-1 with a LOCATOR-2. Then, the LOCATOR-2 specifies a corresponding source data file stored in the PUI file server unit 101. Thereby, the DICON on the INPER 102 is linked with the corresponding source data file stored in the PUI file server unit 101.

Next, a system concept of the PUI document information management system 100 is explained. There may be a way to focus on a contrast between a paper document and an electronic document. Assume that these two documents belong in two different worlds, the former is in a real world and the latter is in an electronic virtual world created by a computer or the like, for example. If the INPER 102 is a paper document generated in the real world, the source data file stored in the PUI file server unit 101 may be a sort of an electronic document that belongs to the electronic virtual world.

As explained earlier, the paper document in the real world normally has no direct way to link with the electronic document in the electronic virtual world. The PUI document information management system 100 performs interactive communications between a computer (i.e. the source data file) and a paper document (i.e. INPER 102), by establishing information to bridge the gap between the two different worlds. The PUI document information management system 100 can accordingly integrate the contents of information provided on the INPER 102 into the system of the electronic document information management and, reversely, allow a direct access into the system of the electronic document information management using the INPER 102. Moreover, a paper-based hyper text document can be created in the real world in a form of the INPER 102 under the environment of the PUI document information management system 100, although the hyper text document itself exists only in the electronic virtual world.

As described above, in the PUI document information management system 100, the TOPICs on the INPER 102 are regarded as documents in a similar way to the hyper text document. This is because each one of the DICONs in the TOPICs of the INPER 102 functions as a switch, equivalent to a button or an icon generally used on a hyper text document in a screen, for calling or not calling the relevant and detailed information.

Next, further details of the INPER 102 are explained with reference to FIGS. 2 and 3. As described above, the INPER 102 is a sheet-formed information medium, including at least a TOPIC, including at least a word, a sentence, a symbol, or a graphic image, and including at least a DICON of at least a word, a sentence, a symbol, or a graphic image. The INPER 102 further includes the same number of LINKS as the DICON. Each LINK links the DICON with a corresponding source data file stored in the PUI file server unit 101. The INPER 102 further includes a SELECTOR for selecting an arbitrary DICON from among the DICONs.

In addition, the INPER 102 further includes document identifying information, recorded thereon and referred to as an INPER ID, that identifies a document recorded on the INPER 102. The DICON, the LINK, and the INPER ID are previously recorded on the INPER 102, and the SELECTOR is given at a later time by the user.

Figure 2:
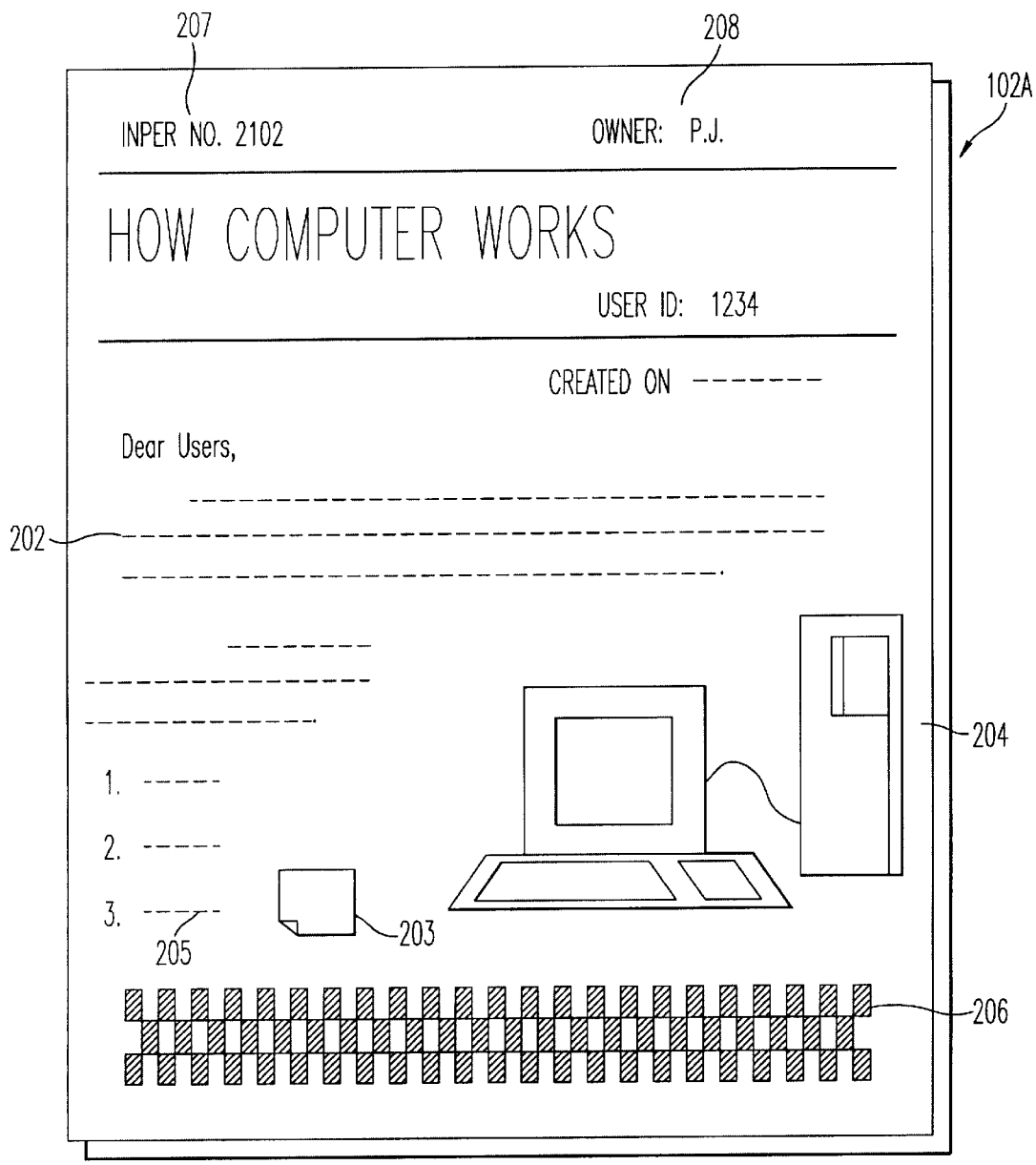
FIG. 2 is an illustration for explaining an example of an INPER (interactive paper) used in the PUI the document information management system shown in FIG. 1.

One type of INPER 102 is referred to as a description INPER 102a, shown in FIG. 2. The description INPER 102a of FIG. 2 has TOPICs and a variety of DICONS in the TOPICs. These DICONS are: a text DICON 202 representing a text including at least a word or a sentence; a symbol DICON 203 representing a symbol such as a so-called document icon, for example, for indicating an existence of a document; a graphic DICON 204 representing a graphic image indicating images such as a computer, for example; and a title DICON 205 representing a title text including at least a word or a relatively short text.

The description INPER 102a of FIG. 2 further includes a code area 206 in which the LINK and the INPER ID are recorded in an optically readable form such as a two-dimensional bar code. Further, the description INPER 102a includes several kinds of human-readable information such as a document ID 207 for indicating a brief content of the INPER ID placed in the code area 206; an owner ID 208 for indicating an owner of the description INPER 102a; and a user ID 209 for indicating user names to which the description INPER 102a will be distributed.

In this way, the description INPER 102a has the TOPICs, the variety of DICONs in the TOPICs, and information indicative of the document identification, the owner of the INPER 102a, and so forth, all of which are information included in a normal document. Therefore, the description INPER 102a can be used in a way equivalent to a normal document sheet, as well as in the PUI document information management system 100.

Figure 3:
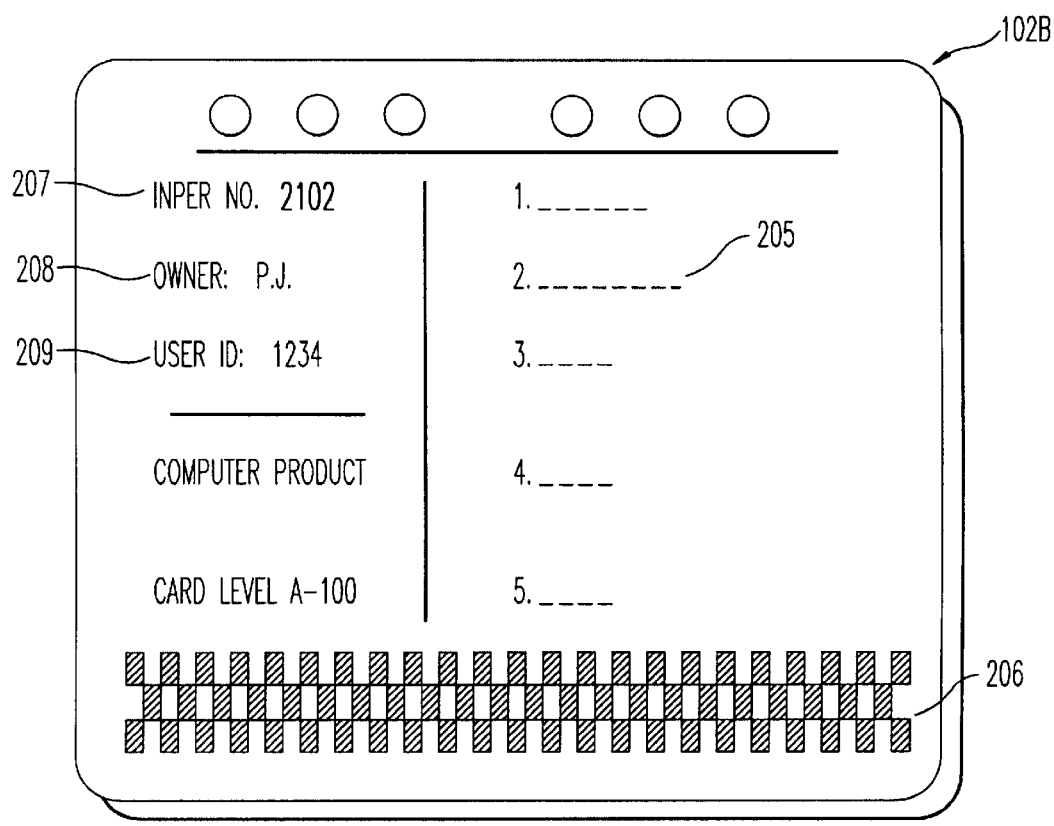
FIG. 3 is an illustration for explaining another example of the INPER used in the PUI document information management system shown in FIG. 1.

Another type of the INPER 102 is a list-directory INPER 102b, shown in FIG. 3. The list-directory INPER 102b shown in FIG. 3 includes a plurality of the title DICONs 205 and the code area 206. The list-directory INPER 102b also includes human-readable information such as the document ID 207, the owner ID 208, and the user ID 209, for example.

With the thus-arranged information, the list-directory INPER 102b may be used in the real world as a reference card, an index card, and the like, being formed in a compact size and having only clear and concise information such as the title DICON 205, for example. In addition, the list directory INPER 102b can be used also in the electronic virtual world to access the source data file stored in the PUI file server unit 101 for further detailed information using the DICONs.

Figure 4:
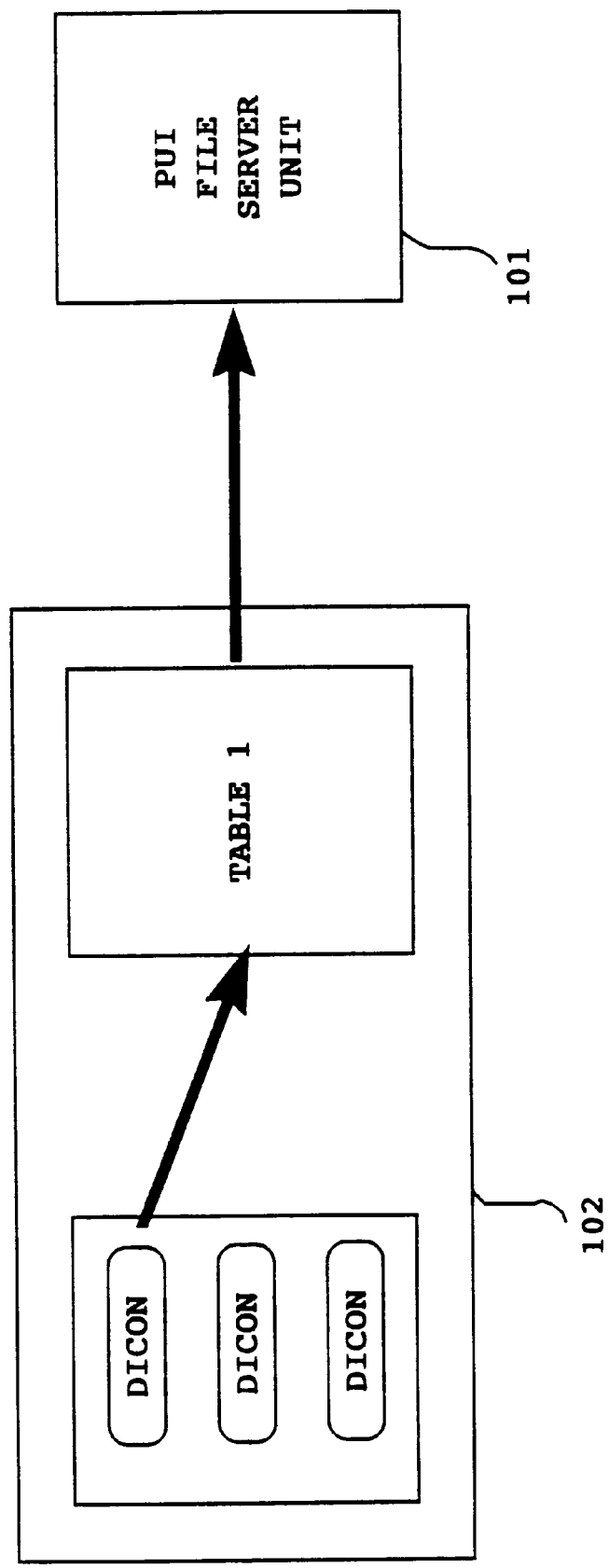
FIG. 4 is an illustration for explaining how a DICON (document icon) is linked with a source data file stored in the PUI file server unit.
Figure 6:
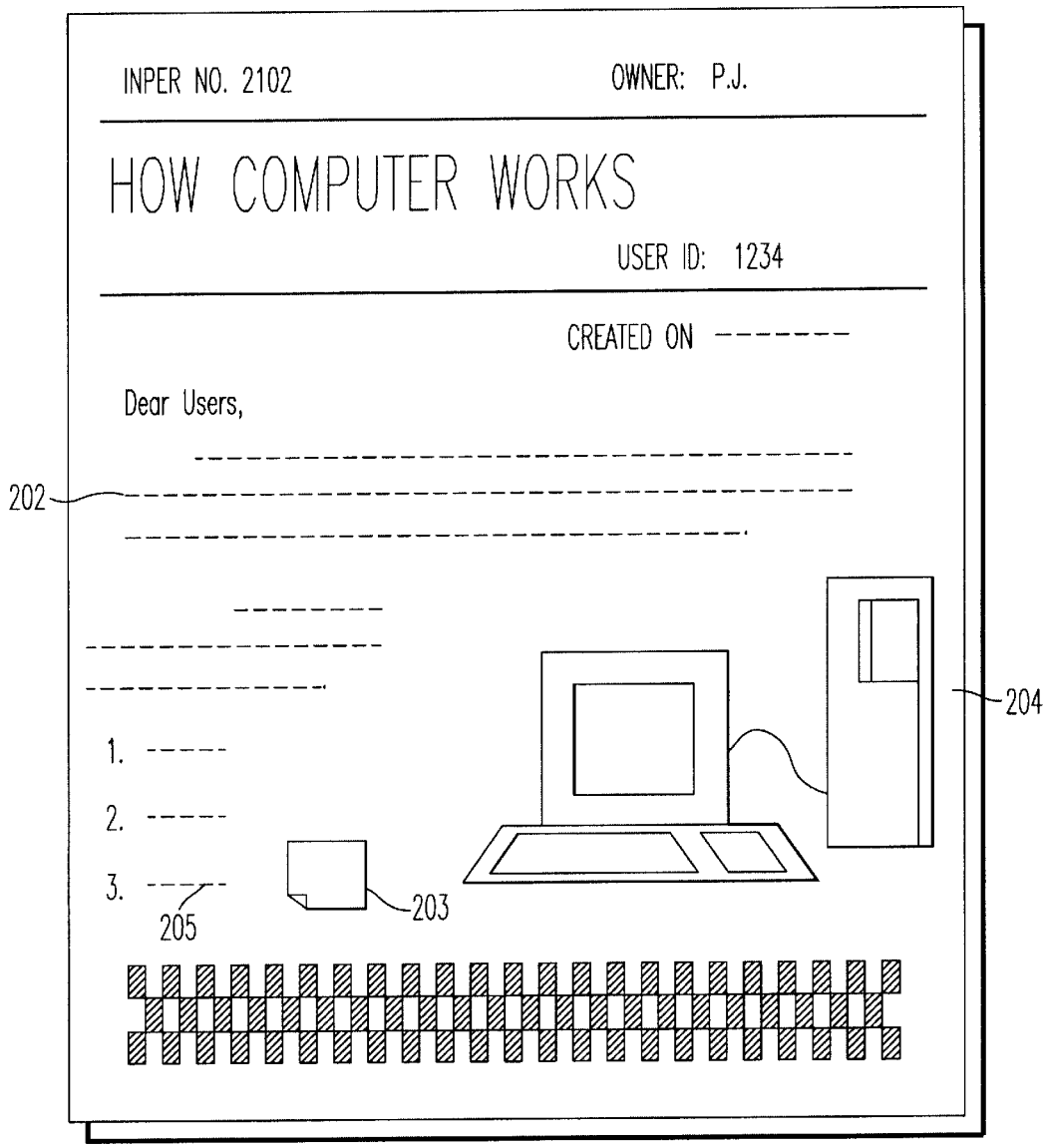
FIG. 6 is an illustration showing how the DICON is presented.

Next, detailed functions of the DICONs are explained with reference to FIGS. 4–6. As shown in FIGS. 4–6, each one of the DICONs 202–205 recorded on the INPER 102 (i.e., the description INPER 102a and the list-directory INPER 102b) links with the corresponding source data file stored in the PUI file server unit 101 by the function of the LINK recorded in the code area 206. Thereby, the user can retrieve a specific source data file from the PUI file server unit 101 by selecting one of the DICONs 202–205 on the INPER 102 (i.e., the description INPER 102a and the list-directory INPER 102b). The DICON itself serves as visual information and also as a switch for selecting a source data file. Each one of the DICONs 202–205 is summarized in the following way:

the text DICON 202 represents a text including words and relatively short sentences included in a description written in a hyper text format;

the symbol DICON 203 is an icon-shaped DICON to be added at the end of a relatively long sentence or to be added to an entire content of the INPER;

the graphic DICON 204 shows a rough image of an illustration, a photograph or so forth, having a link to a detailed image of the same; and the title DICON 205 indicates a title text of the linked source data file, in a list-like form.

A Table 1 shown in FIG. 5 indicates relationships in detail between the DICONS and the linked source data file. As indicated in FIG. 5, the title DICON 205 and the text DICON 202 have text-based data and the symbol DICON 203 and the graphic image DICON 204 have graphic-image-based data. Also, as indicated in FIG. 5, a content indicated by the DICON defines a content of the linked source data file in the following manner, for example.

When the title DICON 205 indicates a title, the source data file includes a document. When the text DICON 202 indicates a reference, the source data file includes a document. When the text DICON 202 indicates a document abstract, the source data file includes the whole document. When the text DICON 202 indicates a word, the source data file includes an explication of the word. When the text DICON 202 indicates a personal name, the source data file includes a profile report on the person and, preferably, a still and/or motion picture and a voice message of the person, for example. In this case, the PUI client terminal apparatus 104 of the PUI document information management system 100 may preferably include a display unit to generate a motion picture output of the person and a voice synthesizer to generate a voice output of the person.

Further, when the symbol DICON 203 indicates a standard symbol, the source data file includes a relevant document or the like and, preferably, a still and/or motion picture and a voice message. In this case, also, the PUI client terminal apparatus 104 of the PUI document information management system 100 may preferably include a display unit to generate a motion picture output and a voice synthesizer to generate a voice output. When the symbol DICON 203 indicates a symbol for representing a document, the source data file includes a relevant document. When the graphic DICON 204 indicates a graphic image in a reduced size, the source data file includes the full-sized graphic image. When the graphic DICON 204 indicates a monochrome graphic image, the source data file includes a full-colored graphic image. When the graphic DICON 204 indicates a dither graphic image, the source data file includes the graphic image in gray-scale.

A way to make a DICON on the INPER 102 (i.e. the description INPER 102a and the list-directory INPER 102b) is shown in FIG. 6. Every DICON must necessarily be recognized clearly and easily by a user. For this purpose, marks for distinguishing the DICONs from other portions of the document are added to the DICONs. The text DICON 202 may be added with a shady background; a colored background; a different font; a different font style such as a slant style, a bold style, an underlined-form, for example; an enclosure, and so forth. The title DICON 205 and the graphic DICON 204 may be added with a shady background, a colored background, an enclosure, and so forth. The symbol DICON 203 may be added with any similar mark as described above, but may not need any mark because, in many cases, the symbol DICON 203 itself has a distinguishable shape and is easy to see.

Next, a role of the SELECTOR is explained with reference to an example shown in FIGS. 7(a) and 7(b). The SELECTOR is given around an arbitrary DICON in the INPER 102 (i.e. the description INPER 102a and the list-directory INPER 102b) to mark that arbitrary DICON so as to select it from among various DICONs recorded on the INPER 102. A mark may be drawn by the user in a way as indicated by arrows or encircling A in FIG. 7(a) and an arrow or checkmark B in FIG. 7(b), for example, and is then handled as a SELECTOR. The mark may be made using, for example, a normal pencil, an ink pen, a marker pen that draws a mark optically readable by the PUI client terminal apparatus 104, etc. Because of the shapes, the marks shown in FIG. 7(a) may be suitable for use as the SELECTOR in the description INPER 102a and the mark in FIG. 7(b) suitable for use as the SELECTOR in the list-directory INPER 102b.

Next, the function of the LINK is explained further in detail with reference to FIGS. 8–10 10(b). As described above, the LINK recorded in the two-dimensional bar-code form in the code area 206 of the INPER 102 includes the LOCATOR-1 and the LOCATOR-2, or the LOCATOR-1 and DICON ID, so as to link a desired DICON with its corresponding source data file stored in the PUI file server unit 101.

Figure 8A:
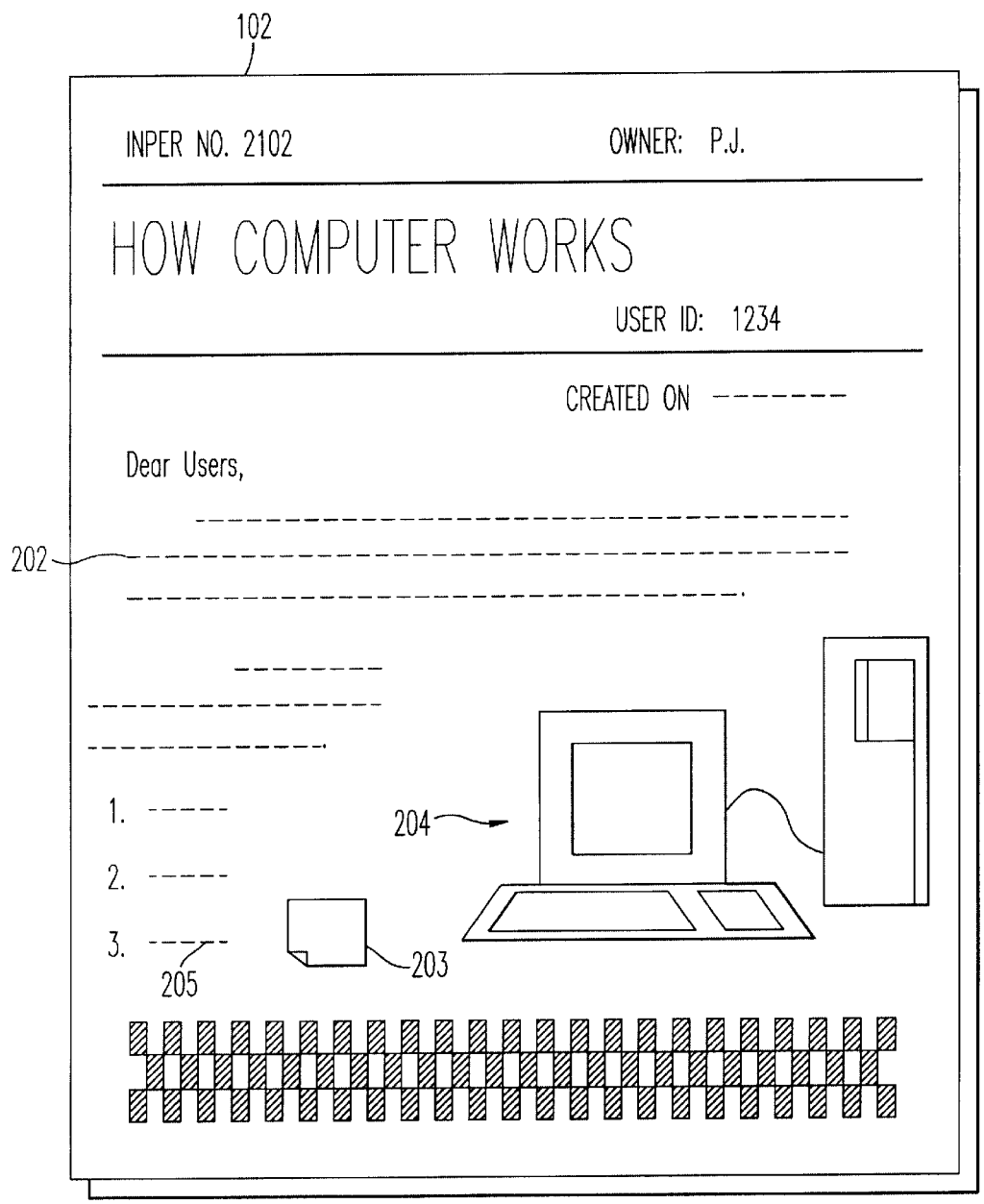
FIG. 8 is an illustration for explaining an exemplary way of how the DICON is specified.
Figure 8B:
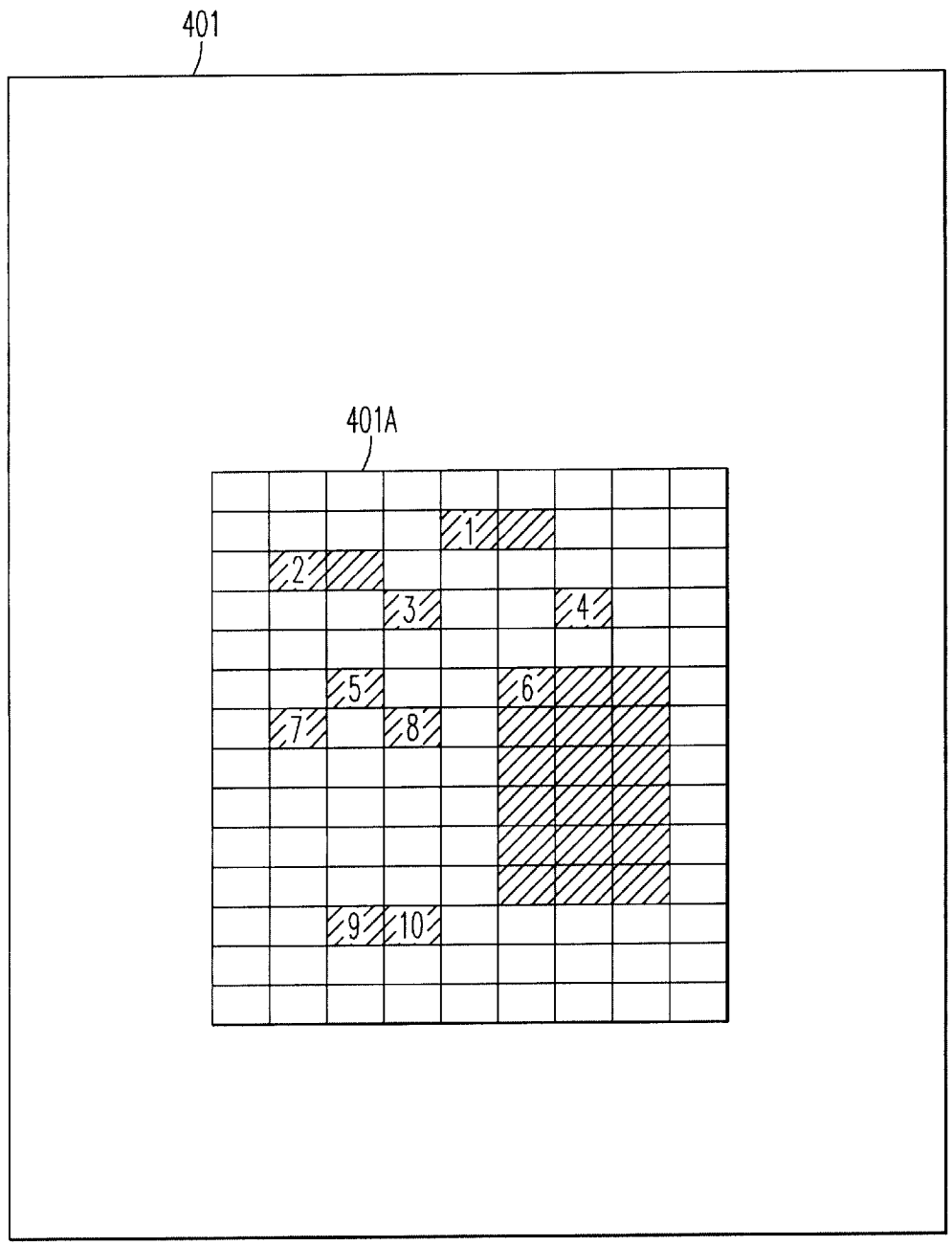

An illustration of FIG. 8 shows one way that a value of the LOCATOR-1 for specifying a location of each DICON on the description INPER 102a is determined. Since determining x- and y- coordinates on the INPER 102, for example, is a simple way to determine a specific position on the INPER 102, a location map 401 having a plurality of positions corresponding to those of the INPER 102 as shown in FIG. 8 is used in this case.

More specifically, the location map 401 of FIG. 8 includes a plurality of blocks, each one of which represents a corresponding area in the description INPER 102a. Each one of the DICONs recorded on the description INPER 102a can correspondingly be indicated on areas on the location map 401, which areas include at least one corresponding block on the location map 401 depending upon an area size of the DICON in the INPER 102a. The thus-specified areas on the location map 401 can be numbered in the order in which the area appears; such a number is determined as a value of the LOCATOR-1 of the LINK so as to specify a specific DICON. In this way, the LOCATOR-1 is given with a specific value for specifying a specific DICON. For example, the ten DICONs in the INPER 102 of FIG. 8 are each placed in an appropriate position and are given a serial number starting from 1.

One type of LINK has the set of the LOCATOR-1 and the LOCATOR-2, as described above. Each one of this type of LINK has a link to a specifically corresponding DICON and, therefore, the same number of LINKS are generated as the DICON in the INPER 102 and are recorded in the code area 206 of the INPER 102. Table 2 of FIG. 9 shows examples of this type of LINK. When the LOCATOR-1 having the above-described value is specified, it automatically links to the coupled LOCATOR-2 as shown in the Table 2 and, then, the coupled LOCATOR-2 specifies the corresponding source data file stored in the PUI file server unit 101.

Figure 7A:
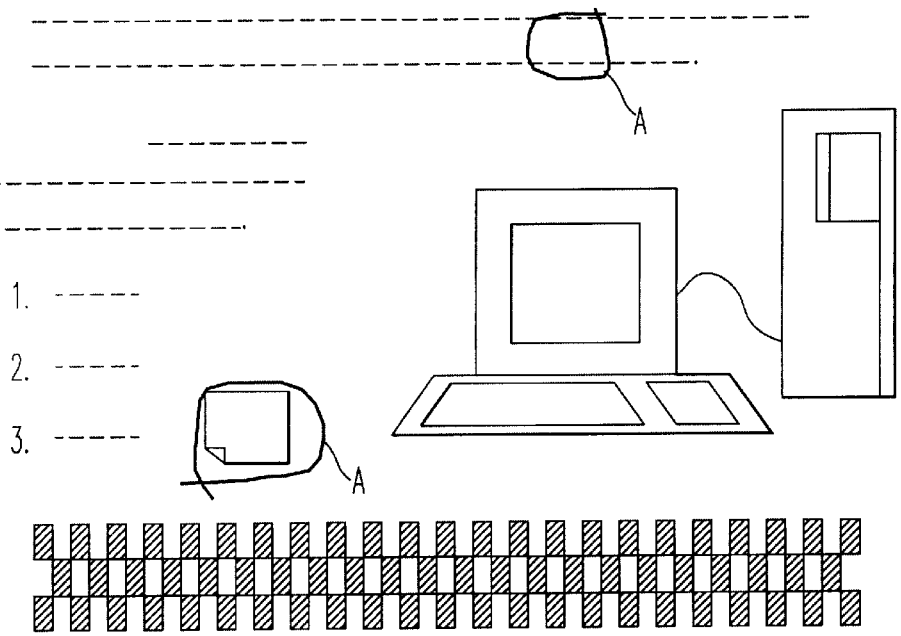
FIGS. 7(a) and 7(b) are illustrations each showing how the DICON on the INPER is selected.
Figure 7B:
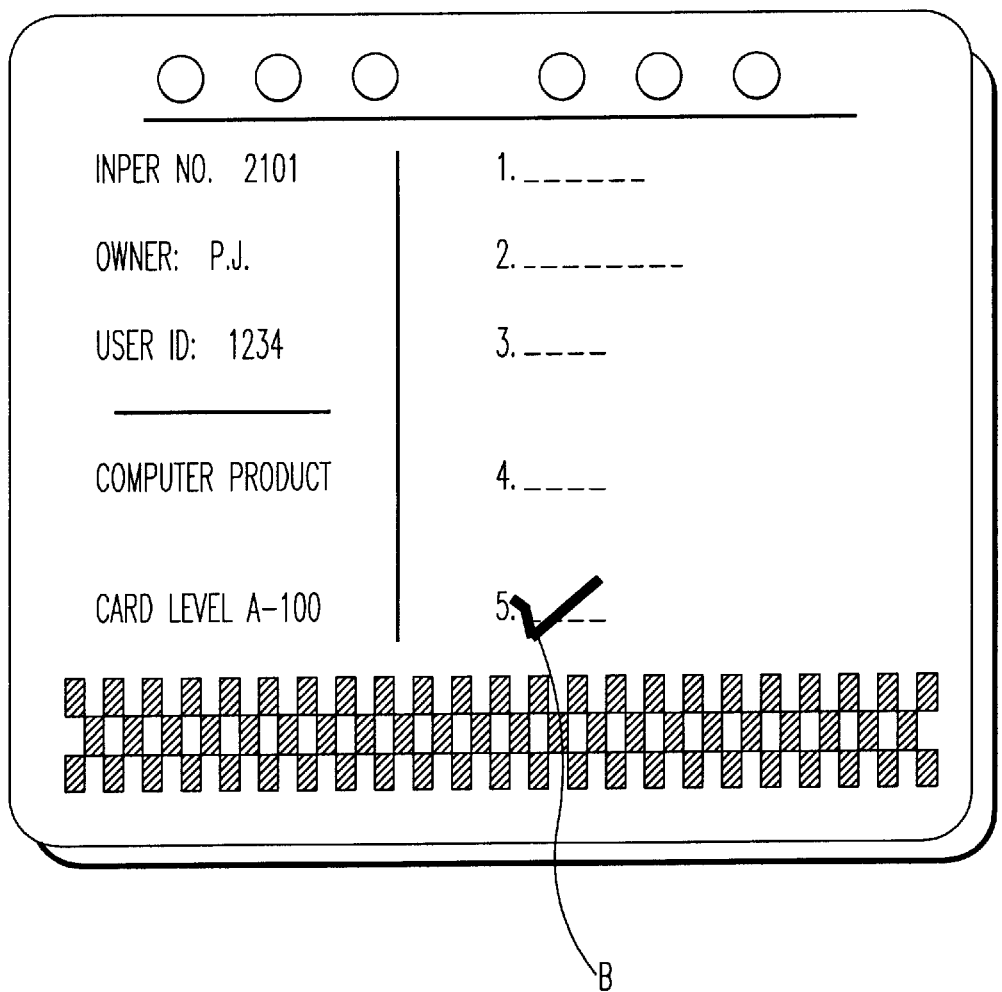

More specifically, when the user gives a SELECTOR for selecting one of the DICONs on the description INPER 102a in a way as shown in, e.g., FIG. 7(a), an area specified by the SELECTOR on the description INPER 102a can be determined by the corresponding area on the location map 401. Then, based on the corresponding area on the location map 401, the DICON that is present within the corresponding area is specified by the specific number that is the value of the LOCATOR-1. After the LOCATOR-1 is specified in this way, the LINK automatically links the LOCATOR-1 to the coupled LOCATOR-2 in accordance with the Table 2 shown in FIG. 9, and then the coupled LOCATOR-2 specifies the corresponding source data file stored in the PUI file server unit 101. In this way, the LINK links the DICON on the description INPER 102a with the corresponding source data file stored in the PUI file server unit 101, using the serial numbers given to the DICONs within a page of the INPER 102.

The other type of LINK has the LOCATOR-1 and the DICON ID, as described above. Each one of this type of LINK also has a link to a specifically corresponding DICON and, therefore, the same number of LINKS are generated as the DICONs in the INPER 102 and are recorded in the code area 206 of the INPER 102. A Table 3 of FIG. 10(a) shows examples of this type of LINK. While the LOCATOR-1 represents the DICON with the serial number effective only within a page of the INPER 102, the DICON ID coupled with the LOCATOR-1 in the LINK identifies each one of the DICONs registered in the PUI file server unit 101. When the LOCATOR-1 is specified, it automatically links to the coupled DICON ID, and then the coupled DICON ID links to the LOCATOR-2 to specify the corresponding source data file stored in the PUI file server unit 101.

More specifically, when the user gives a SELECTOR for selecting one of the DICONs on the description INPER 102a in a way as shown, e.g., in FIG. 7(a), an area specified by the SELECTOR on the description INPER 102a is determined by a corresponding area on the location map 401. Then, based on the corresponding area on the location map 401, the DICON that is present within the corresponding area on the location map 401 can be found and specified by a specific number that is the value of the LOCATOR-1. After the LOCATOR-1 is specified, the LINK automatically links the LOCATOR-1 to the coupled DICON ID in accordance with the Table 3 shown in FIG. 10(a).

In this case, a Table 4 shown in FIG. 10(b) is provided at the PUI master terminal apparatus 103. The Table 4 of FIG. 10(b) includes a plurality of sets of the DICON ID and the LOCATOR-2. Each one of the DICONs is previously given a different number for identification among all the DICONs registered in the PUI file server unit 101, and each one of the DICON IDs includes a specific identification number for specifying a specific DICON. When the DICON ID coupled to the LOCATOR-1 is specified in the above-described way, the DICON ID that identifies a specific DICON automatically specifies the coupled LOCATOR-2 that identifies an address of the corresponding source data file in the PUI file server unit 101, in accordance with the Table 4 of FIG. 10(b). Then, the coupled LOCATOR-2 specifies the corresponding source data file stored in the PUI file server unit 101.

In this way, the LINK links the DICON on the description INFER 102a with the corresponding source data file stored in the PUI file server unit 101, using the serial numbers for specifying the DICONs within a page of a particular INPER 102 and also the numbers for specifying the DICONs among all the DICONS registered in the PUI file server unit 101.

The LINK shown in FIG. 9 links the DICON on the INPER 102 to the corresponding source data file in a one-to-one relationship. Accordingly, this LINK of FIG. 9 is obviously suitable for a case in which an INPER 102 is first generated, meaning that the Table 2 is first generated, and then a corresponding source data file is generated. In this case, the address of the corresponding source data file in the PUI file is not changeable after the INPER 102 is generated and the Table 2 is fixed in the INPER 102. Therefore, this type of LINK is suitable for a relatively small scale system of the PUI document information management system 100.

The LINK shown in FIG. 10(a) links the DICON on the INPER 102 to the corresponding DICON ID in a one-to-one relationship. And the linkage of the DICON ID and the corresponding source data file is determined in accordance with the Table 3 provided at the PUI file server unit 101 side. Therefore, in this case, the address of the corresponding source data file in the PUI file can be changed even after the INPER 102 is generated and the Table 3 is fixed in the INPER 102. The change of the address can be made only by changing the address in the Table 3 at the PUI file server unit 101. Therefore, this type of LINK gives to the system a greater potential for expandability and management capability and is therefore suitable for a relatively large scale system of the PUI document information management system 100.

It is preferable to specify a DICON effective area 401a on the INPER 102 as shown in FIG. 8. The DICON effective area 401a is an only area in which the DICON can be generated. By giving a limited size of the DICON effective area 401a to the INPER 102, a volume of information to be contained in the code area 206 can be reduced. Thereby, the DICON effective area 401a is useful, particularly when the DICONs are to be generated only in a certain limited area on the INPER 102.

In addition, the DICON and the corresponding source data file may be linked in a one-to-multiple or multiple-to one relationship, although the cases shown in FIGS. 9–10(b) are in a one-to-one relationship.

Next, an outline procedure of generating the INPER 102 and the source data file is explained with reference to FIGS. 11(a) and 11(b). In the PUI document information management system 100, the INPER 102 and the source data file are generated using the same dedicated application software that is developed for this use.

Figure 11A:
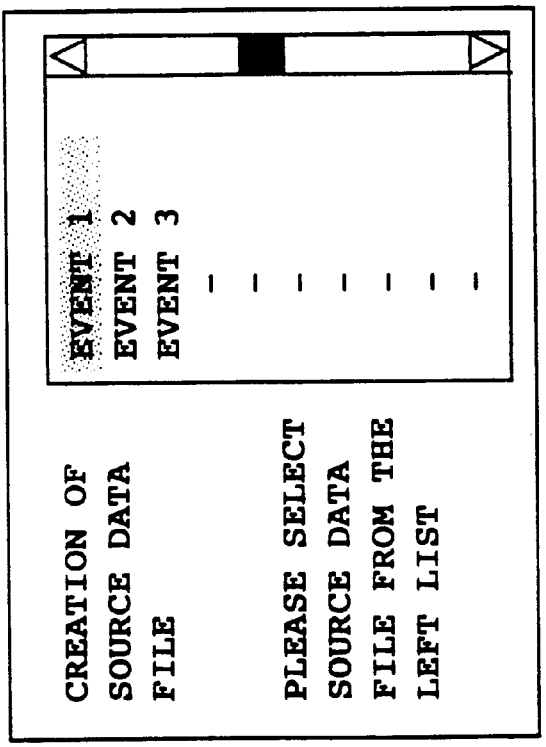
FIGS. 11(a) and 11(b) are illustrations for explaining operations of generating the INPER and the source data file.
Figure 11B:
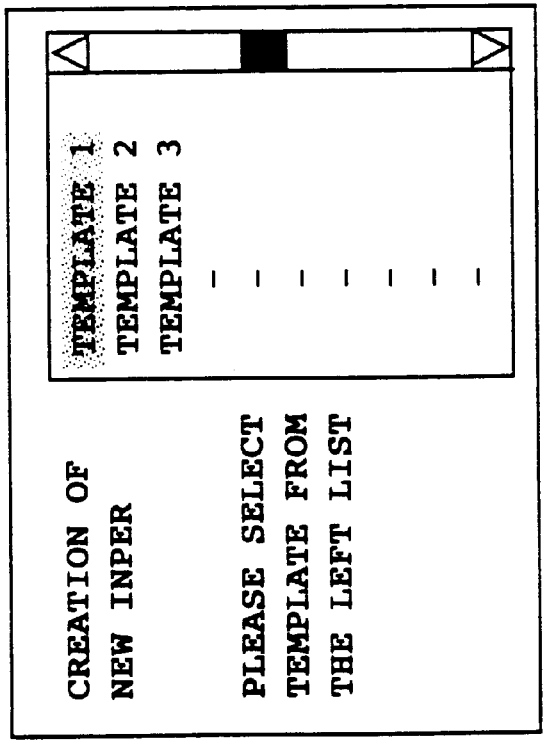

FIG. 11(a) shows an example of an INPER generation dialog in the INPER generating application software on the personal computer, for example. In the INPER generation dialog shown in FIG. 11(a), a desired template for the INFER 102 is selected by the user. Then, the user fills the header of the template with a title, an author's name, and so on, and fills the body of the template with a description. Then, the user selects a desired information component, including at least a word, a relatively short sentence, an illustration, a photograph, or the like. Then, with keeping the desired information component selected, the user opens a source data file dialog shown in FIG. 11(B).

When the selected information component is desired to be linked to the source data file already registered in the PUI file server unit 101, the user will search corresponding source data files through the PUI file server unit 101 on the source data file dialog. When finding one, the user will click it for selection. In this way, the user can make the desired information component in the INFER 102 as a new DICON that has the corresponding source data file in the PUI file server unit 101.

There may be a case in which the user desires to create a new source data file and to register it in the PUI file server unit 101, so as to link the selected information component to the new source data file. In this case, the user needs to click a new file button in the source data file dialog shown in FIG. 11(b). Then, a source data file generation dialog that has the same appearance as the INPER generation dialog shown in FIG. 11(a) is opened. On the source data file generation dialog, the user fills the header of the template with a title, an author's name, and so on, and fills the body of the template with a description, in a similar manner as the INPER generation dialog. In this way, the user can make the desired information component in the INPER 102 as a new DICON that has a new corresponding source data file newly registered in the PUI file server unit 101.

By closing the source data file generation dialog, the linkage between the DICON and the corresponding source data file is performed. Then, by closing the INPER generation dialog, the LOCATOR-1 and the LOCATOR-2 or the DICON ID are automatically generated as the LINK in the code area 206 and a new INPER 102 is generated as an electronic document on the personal computer. When the new INPER 102 stored in the computer is output by a printer or the like, the new INPER 102 is produced as a paper document.

Selection of DICON and source data files and creation of a new source data file in the above-mentioned procedure may be performed at an arbitrary time during and after the INPER 102 is generated on the personal computer. In addition, a change and an addition of a DICON in the INPER 102 can also be performed at an arbitrary time during and after the INPER 102 is generated on the personal computer.

As described above, the source data file generation and the INPER generation are made in a similar procedure using a similar application dialog. The source data file may preferably be created to function not only as the source data file but also as an INPER 102. It can be achieved by creating a source data file that has the DICONs linked with the corresponding source data files, in the same manner as the INPER 102 is created. When the thus-created source data file is produced on a printer or the like, the output sheet can be used as the INPER 102.

In this way, the relationship between the DICONs in the INPER 102 and the source data file can be expanded largely.

Figure 12:
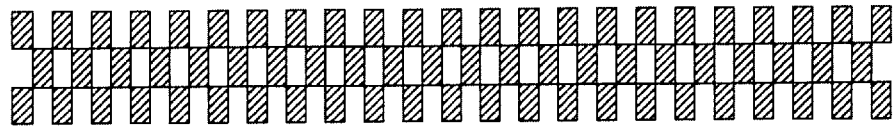
FIG. 12 is an illustration for explaining an operation of the PUI document information management system using the INPER.

Next, an operation of the PUI document information management system 100 having the above-mentioned configuration is explained with reference to FIGS. 12 and 13. FIG. 12 shows an example of an INPER 102 having a DICON that is added with a shady background.

Figure 13:
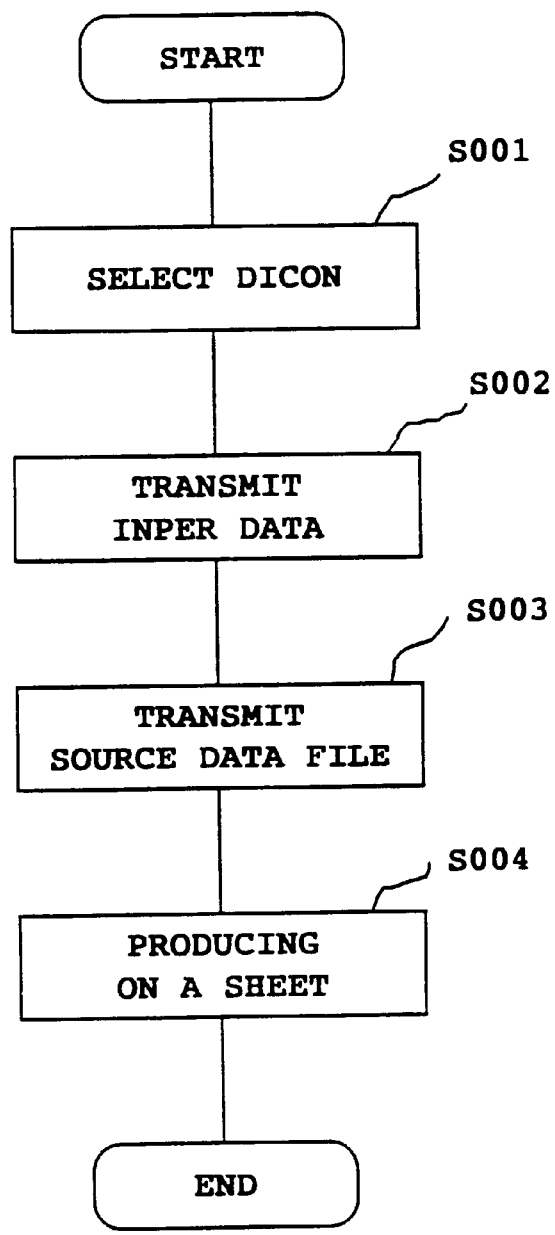
FIG. 13 is a flowchart showing an operation of the PUI document information management system shown in FIG. 1.

In Step S001 of FIG. 13, a user gives a SELECTOR 1201 shown in FIG. 12 to select a DICON for further detailed information, and then places the INPER 102 on the PUI client terminal apparatus 104 so that the INPER 102 is read. In Step S002, the PUI client terminal apparatus 104 transmits the read data including at least the SELECTOR 1201 and the LINK to the PUI master terminal apparatus 103 using one of a facsimile data transmission mode or a normal data transmission mode over the public telephone line 106.

Then, in Step S003, the PUI master terminal apparatus 103 searches in the PUI file server unit 101 for a source data file corresponding to the marked DICON on the INFER 102 on the basis of the SELECTOR 1201 and the LINK as described above. When the source data file is found, data of the contents of the corresponding source data file are transmitted back to the PUI client terminal apparatus 104 using one of a facsimile data transmission mode or a normal data transmission mode over the public telephone line 106. Then, in Step S004, the PUI client terminal apparatus 104 receives the data of the contents of the corresponding source data file and can then produce the PUI output sheet 105, shown in FIG. 1, on which contents of the corresponding source data file from the PUI file server unit 101 is recorded. Then, the process is ended.

In this way, the PUI document information management system 100 allows a user at a remote site to retrieve the necessary PUI output sheet 105 including the source data file from the PUI file server unit 101.

In addition, the PUI document information management system 100 uses the INPER 102 that can be used as the hyper text document as well as the general paper document and does not require a mark sheet or the like that needs a dedicated facsimile data transmission mode and a normal data transmission mode over the public telephone line 106.

In addition, the PUI client terminal apparatus 104 may include a function for automatically selecting only the SELECTOR and the LINK from among all the data on the INPER 102 and transmitting only the selected data of the SELECTOR and the LINK to the PUI master terminal apparatus 103, so that the size of the transmission data can be reduced, and accordingly the transmission time can be shortened.

Figure 14:
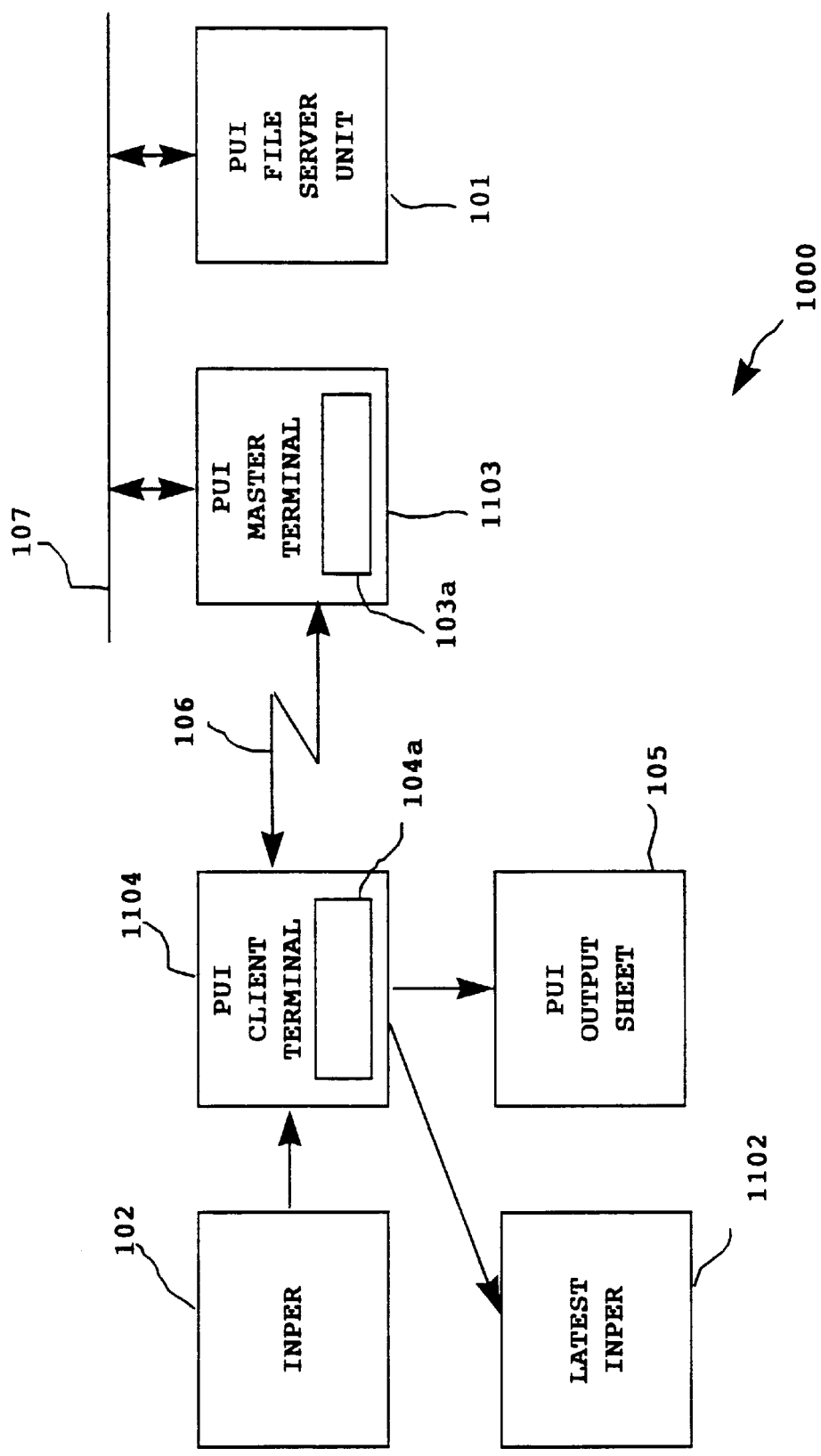
FIG. 14 is a block diagram of a modified PUI document information management system.

Next, a modified PUI document information management system 1000 is explained with reference to FIG. 14. FIG. 14 shows a modified PUI document information management system 1000 that includes elements similar to the PUI document information management system 100 of FIG. 1, except for the following few elements which are modified or added.

The PUI master terminal apparatus 1103 is a modified element of the PUI master terminal apparatus 103 and the modification is an addition of a user ID (identification) management unit 103*a* for generating a user ID request, for storing a plurality of registered user IDS, and for determining whether a received user ID is a registered user ID. The PUI client terminal apparatus 1104 is a modified element of the PUI client terminal apparatus 104 and the modification is an addition of a user ID (identification) input unit 104*a* for inputting a user ID and a display panel (not shown) for indicating various kinds of information such as an entered user ID, a user ID request message, and so forth. The PUI client terminal apparatus 1104 may be a normal facsimile apparatus. The PUI master terminal apparatus 1103 is connected to the PUI file server unit 101 through a computer network 107, for example, and to the PUI client terminal apparatus 1104 over a telephone line 106. Reference numeral 1102 in FIG. 14 denotes a latest INPER which includes the same information as the INPER 102; the latest INPER 1102 is clean, having no markings and so forth.

Figure 15:
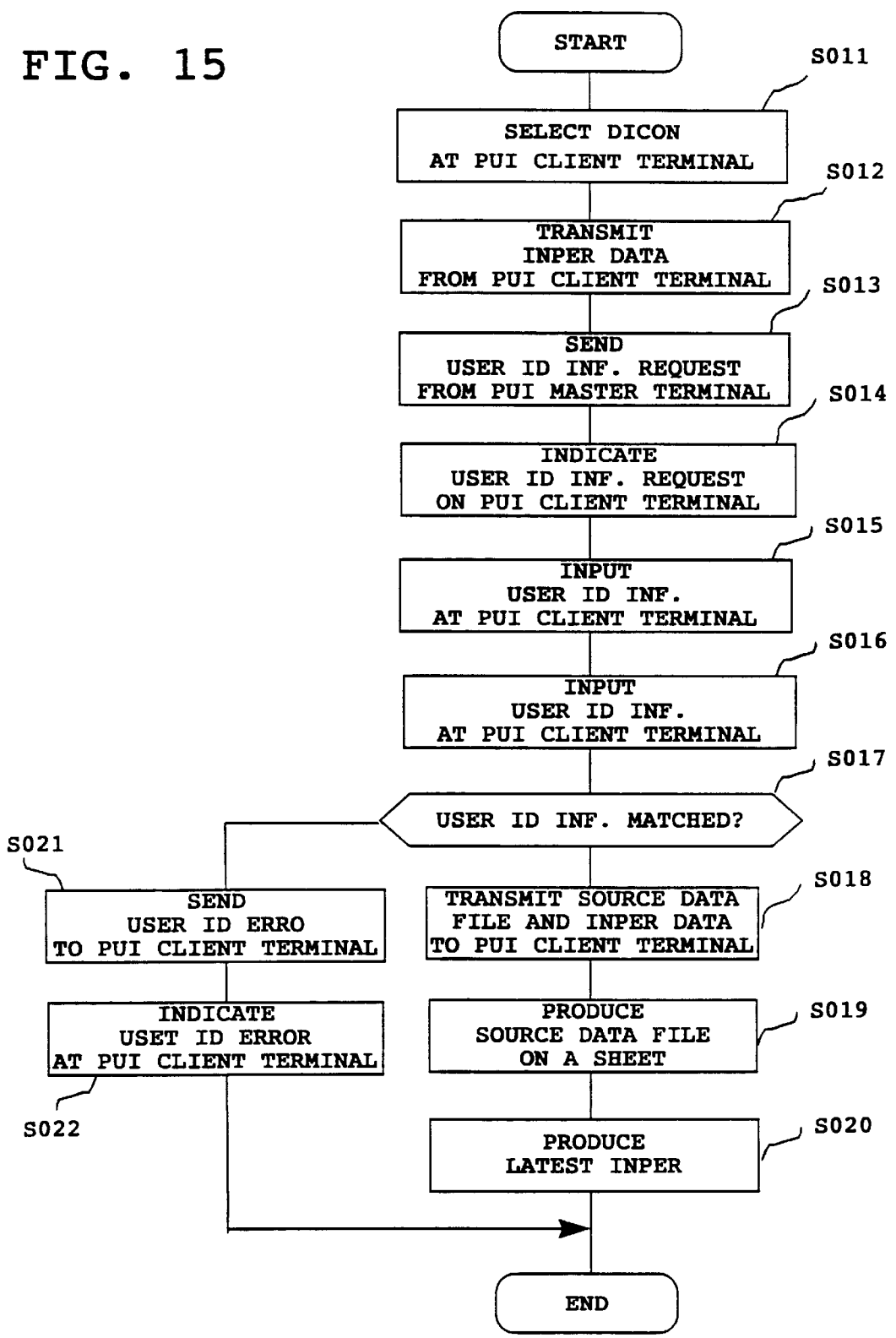
FIG. 15 a flowchart for explaining an operation of the modified PUI document information management system shown in FIG. 14.

Next, an operation of the modified PUI document information management system 1000 is explained with reference to FIG. 15. In Step S011 of FIG. 15, a user uses the SELECTOR 1201 shown in FIG. 12 to select a DICON for further detailed information, and then places the INPER 102 on the PUI client terminal apparatus 1104 so that the INPER 102 is read. In Step S002, the PUI client terminal apparatus 1104 transmits the read data including at least the SELECTOR 1201 and the LINK to the PUI master terminal apparatus 1103 using one of a facsimile data transmission mode or a normal data transmission mode over the public telephone line 106.

Upon receiving the information of the INPER 102 from the PUI client terminal apparatus 1104, the user ID verifying unit 103*a* of the PUI master terminal apparatus 1103 sends the user ID request to the PUI client terminal apparatus 1104 in Step S013. Then, in Step S014, the display unit of the PUI client terminal apparatus 1104 displays the user ID request thereon when the PUI client terminal apparatus 1104 receives the user ID request sent by the PUI master terminal apparatus 1103.

In Step S015, the user inputs a predetermined user ID through the user ID input unit 104*a* of the PUI client terminal apparatus 1104, and the client terminal apparatus 1104 transmits the user ID to the PUI master terminal apparatus 1103. Then, in Step S016, the PUI master terminal apparatus 1103 receives the user ID and the user ID managing unit 104*a* of the PUI master terminal apparatus 1103 determines whether the user ID is a registered ID.

When the user ID is determined as a registered ID and the result of Step S016 is YES, the process proceeds to Step S018. In Step S018, the PUI master terminal apparatus 1103 searches in the PUI file server unit 101 for a source data file corresponding to the marked DICON on the INPER 102 on the basis of the SELECTOR 1201 and the LINK as described above. Then, also in Step S018, when finding the corresponding data file, the PUI master terminal apparatus 1103 transmits data of the contents of the corresponding source data file and also the whole data of the received INFER 102 back to the PUI client terminal apparatus 1104 using one of a facsimile data transmission mode or a normal data transmission mode over the public telephone line 106.

Then, in Step S019, upon receiving the data of the contents of the corresponding source data file and the whole data of the received INPER 102, the PUI client terminal apparatus 1104 produces the PUI output sheet 105 on which contents of the corresponding source data file from the PUI file server unit 101 are recorded. Then, in Step S020, the PUI client terminal apparatus 1104 also produces the latest INPER 1102 on which the same information as the INPER 102 is recorded. Then, the process is ended.

When the user ID is determined as not a registered ID and the result of Step S016 is NO, the process proceeds to Step S021 and the PUI master terminal apparatus 1103 disables data transmission of the requested source data file to the PUI client terminal apparatus 1104 and sends a message indicative of the user ID error to the PUI client terminal apparatus 1104. Then, in Step S021, the PUI client terminal apparatus 1104 receives the message sent from the PUI master terminal apparatus 1103 and then informs the user that the user has no access right by an indication on a display or a printing or by a buzzer or the like. Then, the process is ended. In this way, the PUI document information management system 1000 allows a user at a remote site to retrieve the necessary PUI output sheet 105 including the source data file from the PUI file server unit 101, while also assuring that the source data file is supplied only to the registered user.

Figure 16:
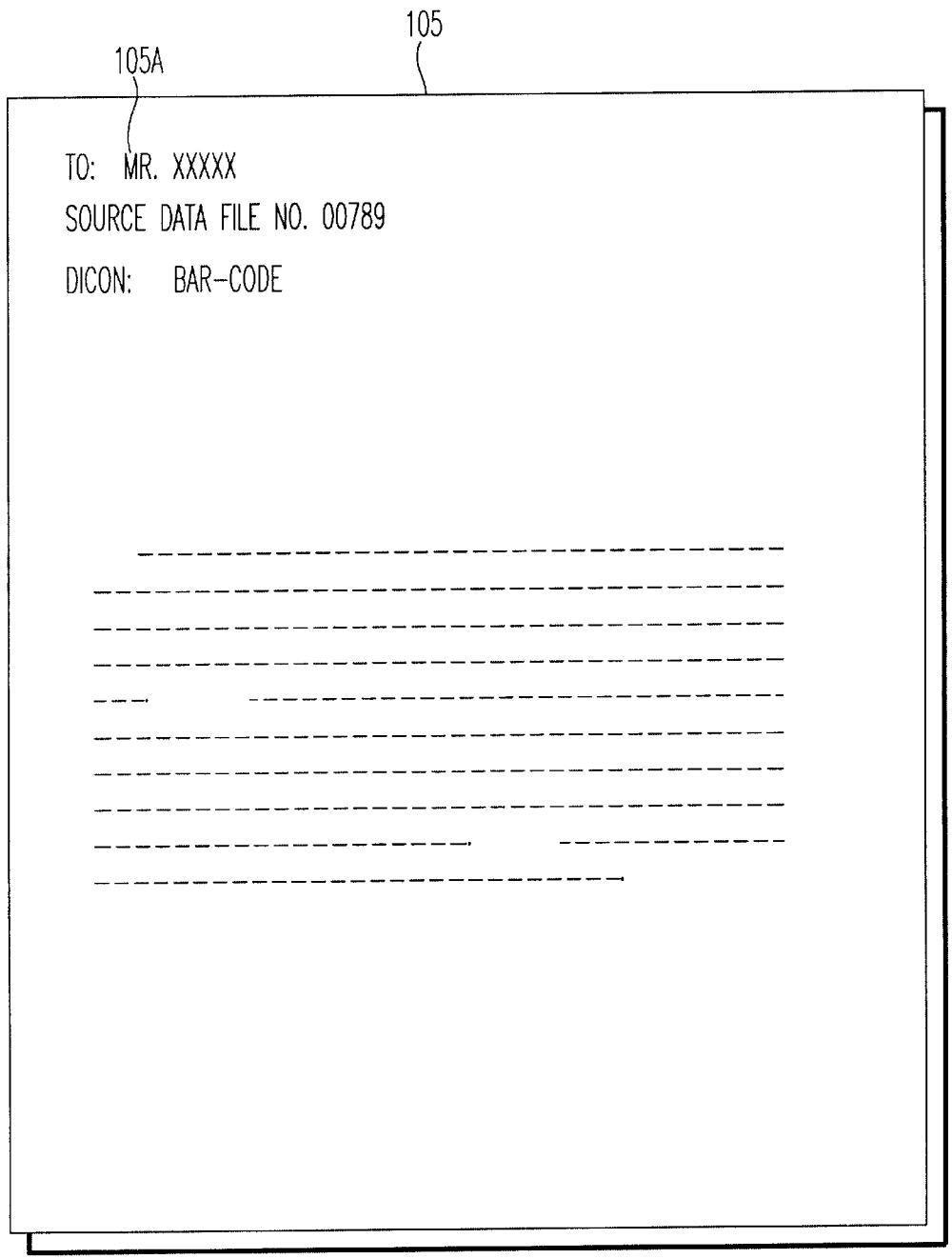
FIG. 16 is an illustration for explaining a PUI output sheet.

In addition, the PUI output sheet 105 shown in FIGS. 1 and 14 may preferably include the document ID 207, the selected DICON, and the user name as shown in FIG. 16 so that the PUI output sheet 105 can easily be identified and may be convenient for distribution.

In addition, the user ID management unit 103*a* may preferably include a function of determining whether the received user ID is a registered user ID by verifying the received user ID against the registered user IDs which are stored in the user ID management unit 103*a* or in the PUI file server unit 101, for example. Alternatively, such a user ID verifying function can be performed by the PUI file server unit 101.

In addition, the PUI master terminal apparatus 1103 may preferably include a function for determining whether to send the same data of the received INPER 102 to the PUI client terminal apparatus 1104 in accordance with an instruction of the user sent via the PUI client terminal apparatus 1104.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent application No. JPAP08-266433 filed in the Japanese Patent Office on Oct. 7, 1996, the entire contents of which are hereby incorporated by reference.

What is claimed as new and is desired to be secured by Letters Patent of the United States is:

1. A document information management system, comprising:

electronic file storing means for storing a plurality of electronic source data files each including information related to a corresponding one of information components, each one of said plurality of said electronic source data files being linked with and accessed by said corresponding one of said plurality of said information components;

at least one paper sheet-formed information medium on which at least one document object including at least one of said plurality of said information components is pre-recorded, on which link a hyper-text link including hyper-text information for linking one of said plurality of said electronic source data files stored in said electronic file storing means with said corresponding one of said plurality of said information components is pre-recorded, and on which selecting information for selecting at least one of arbitrary information components from among said plurality of said information components included in said plurality of said document objects recorded on said at least one paper sheet-formed information medium is recorded;

a control terminal apparatus connected to said electronic file storing means and including a communication function for receiving and transmitting data and a retrieval function for retrieving a desired file from among said plurality of said electronic source data files stored in the electronic file storing means; and at least one remote terminal apparatus capable of reading data recorded on said at least one paper sheet-formed information medium, receiving data from and transmitting data to said control terminal apparatus, and producing a document that includes said data received from said control terminal apparatus on a paper recording sheet; and wherein when said at least one remote terminal apparatus reads said recorded data of said at least one paper sheet-formed information medium and transmits said recorded data to said control terminal apparatus, said control terminal apparatus receives said recorded data of said at least one paper sheet-formed information medium, retrieves a corresponding electronic source data file from among said plurality of said electronic source data files stored in said electronic file storing means by use of said selecting information and said hyper-text link information included in said recorded data which is sent from said at least one remote terminal apparatus, and then transmits said corresponding electronic source data file to said at least one remote terminal apparatus.

2. The document information management system according to claim 1, wherein said at least one remote terminal apparatus further includes selecting means for selecting and for transmitting only said selecting information and said link information when said at least one remote terminal apparatus reads said recorded data of said at least one paper sheet-formed information medium and transmits said recorded data to said control terminal apparatus.

3. A document information management system, comprising:

electronic file storing means for storing a plurality of electronic source data files each including information related to a corresponding one of information components, each one of said plurality of said electronic source data files being linked with and accessed by said corresponding one of said plurality of said information components;

at least one paper sheet-formed information medium on which at least one document object including at least one of said plurality of said information components is pre-recorded, on which a hyper-text link including hyper-text link information for linking one of said plurality of said electronic source data files stored in said electronic file storing means with said corresponding one of said plurality of said information components is pre-recorded, and on which selecting information for selecting at least one of arbitrary information components from among said plurality of said information components included in said plurality of said document objects recorded on said at least one paper sheet-formed information medium is recorded;

a control terminal apparatus connected to said electronic file storing means and including a communication function for receiving and transmitting data, a retrieval function for retrieving a desired file from among said plurality of said electronic source data files stored in the electronic file storing means, and a user identification verifying function for storing a plurality of registered user names, for sending a user identification information request to said at least one remote terminal apparatus, and for verifying user identification information transmitted from said at least one remote terminal apparatus against said plurality of said registered user names; and at least one remote terminal apparatus capable of reading data recorded on said at least one paper sheet-formed information medium, receiving data from and transmitting data to said control terminal apparatus, producing a document that includes said data received from said control terminal apparatus on a paper recording sheet, and receiving an input for said user identification information entered by a user; and wherein when said at least one remote terminal apparatus receives said input for said user identification information, reads said recorded data of said at least one paper sheet-formed information medium and transmits said input for said user identification information and said recorded data to said control terminal apparatus, said control terminal apparatus receives said input for said user identification information and said recorded data of said at least one paper sheet-formed information medium, retrieves a corresponding electronic source data file from among said plurality of said electronic source data files stored in said electronic file storing means by use of said input for said user identification information and said selecting information and said hyper-text link information included in said recorded data which is sent from said at least one remote terminal apparatus, and then transmits said corresponding electronic source data file to said at least one remote terminal apparatus.

4. The document information management system according to claim 3, wherein said recorded data of said paper sheet-formed information medium further includes said user identification information, and said user identification information verifying function performed by said control terminal apparatus verifies data of said input for said user identification information entered by said user against said user identification information included in said recorded data of said paper sheet-formed information medium.

5. The document information management system according to claim 3, wherein said electronic file storing means further stores said plurality of said registered user names, and said user identification information verifying function performed by said control terminal apparatus verifies data of said input for said user identification information entered by said user against data of said plurality of said registered user names stored in said electronic file storing means.

6. The document information management system according to claim 3, wherein said control terminal apparatus transmits said desired file retrieved from among said plurality of said electronic source data files stored in the electronic file storing means to said at least one of said remote terminal apparatus when said data of said input for said user identification information is matched by said user identification information verifying function performed by said control terminal apparatus, and said control terminal apparatus does not transmit data of said desired file retrieved from among said plurality of said electronic source data files stored in the electronic file storing means to said at least one of said remote terminal apparatus when said data of said input for said user identification information is not matched by said user identification information verifying function performed by said control terminal apparatus.

7. The document information management system according to claim 6, wherein said control terminal apparatus transmits information indicative of a matching error of said user identification information to said at least one of remote terminal apparatus when said data of said input for said user identification information is not matched by said user identification information verifying function performed by said control terminal apparatus, and said at least one of remote terminal apparatus indicates said matching error of said user identification information.

8. A document information management system, comprising:

electronic file storing means for storing a plurality of electronic source data files each including information related to a corresponding one of information components, each one of said plurality of said electronic source data files being linked with and accessed by said corresponding one of said plurality of said information components;

at least one paper sheet-formed information medium on which at least one document object including at least one of said plurality of said information components is pre-recorded, on which a hyper-text link including hyper-text link information for linking one of said plurality of said electronic source data files stored in said electronic file storing means with said corresponding one of said plurality of said information components is pre-recorded, on which selecting information for selecting at least one of arbitrary information components from among said plurality of said information components included in said plurality of said document objects recorded on said at least one paper sheet-formed information medium is recorded, and on which a user identification information is recorded;

a control terminal apparatus connected to said electronic file storing means and including a communication function for receiving and transmitting data, a retrieval function for retrieving a desired file from among said plurality of said electronic source data files stored in the electronic file storing means, and a user identification verifying function for storing a plurality of registered user names, and for verifying user identification information recorded on said paper sheet-formed information medium against said plurality of said registered user names; and at least one remote terminal apparatus capable of reading data recorded on said at least one paper sheet-formed information medium, receiving data from and transmitting data to said control terminal apparatus, and producing a document that includes said data received from said control terminal apparatus on a paper recording sheet; and wherein when said at least one remote terminal apparatus reads said recorded data of said at least one paper sheet-formed information medium and transmits at least said user identification information, said selecting information, and said hyper-text linking information to said control terminal apparatus, said control terminal apparatus receives at least said user identification information, said selecting information, and said hyper-text linking information, retrieves a corresponding electronic source data file from among said plurality of said electronic source data files stored in said electronic file storing means by use of said user identification information and said selecting information and said hyper-text link information included in said recorded data which is sent from said at least one remote terminal apparatus, and then transmits said corresponding electronic source data file to said at least one remote terminal apparatus.

9. The document information management system according to claim 8, wherein said control terminal apparatus transmits said desired file retrieved from among said plurality of said electronic source data files stored in the electronic file storing means to said at least one of said remote terminal apparatus when said transmitted data of said user identification information is matched by said user identification information verifying function performed by said control terminal apparatus, and said control terminal apparatus does not transmit data of said desired file retrieved from among said plurality of said electronic source data files stored in the file storing means to said at least one of said remote terminal apparatus when said transmitted data of said user identification information is not matched by said user identification information verifying function performed by said control terminal apparatus.

10. A document information management system, comprising:

electronic file storing means for storing a plurality of electronic source data files each including information related to a corresponding one of information components, each one of said plurality of said electronic source data files being linked with and accessed by said corresponding one of said plurality of said information components;

at least one paper sheet-formed information medium on which at least one document object including at least one of said plurality of said information components is pre-recorded, on which a hyper-text link including hyper-text link information for linking one of said plurality of said electronic source data files stored in said electronic file storing means with said corresponding one of said plurality of said information components is pre-recorded, on which selecting information for selecting at least one of arbitrary information components from among said plurality of said information components included in said plurality of said document objects recorded on said at least one paper sheet-formed infomation medium is recorded, and on which identification information of said paper sheet-formed information medium is recorded;

a control terminal apparatus connected to said electronic file storing means and including a communication function for receiving and transmitting data and a retrieval function for retrieving a desired file from among said plurality of said electronic source data files stored in the electronic file storing means; and at least one remote terminal apparatus capable of reading data recorded on said at least one paper sheet-formed information medium, receiving data from and transmitting data to said control terminal apparatus, and producing a document that includes said data received from said control terminal apparatus on a paper recording sheet; and wherein said electronic file storing means further stores said recorded data of said at least one of said paper sheet-formed information medium including said selecting information, and, when said at least one remote terminal apparatus reads said recorded data of said at least one paper sheet-formed information medium and transmits at least said identification information of said paper sheet-formed information medium, said selecting information, and said hyper-text linking information included in said recorded data to said control terminal apparatus, said control terminal apparatus receives at least said identification information of said paper sheet-formed information medium, said selecting information, and said hyper-text linking information, then retrieves said recorded data of said at least one of said paper sheet-formed information medium including said selecting information and said corresponding electronic source data file from among said plurality of said electronic source data files stored in said electronic file storing means by use of said identification information of said paper sheet-formed information medium, said selecting information, and said hyper-text link information included in said recorded data which is sent from said at least one remote terminal apparatus, and then transmits said recorded data of said at least one of said paper sheet-formed information medium including said selecting information and said corresponding electronic source data file to said at least one remote terminal apparatus.

11. The document information management system according to claim 10, wherein said control terminal apparatus further includes a switching function for switching between modes of transmitting said at least one paper sheet-formed information medium with said selecting information and transmitting said at least one paper sheet-formed information medium without said selecting information, said at least one of said remote terminal apparatus further includes an inputting function for receiving an input of selecting said modes entered by a user and transmitting said input to said control terminal apparatus, said switching function operating in accordance with said input transmitted from said at least one of said remote terminal apparatus, and said control terminal apparatus transmits said at least one paper sheet-formed information medium without said selecting information when said switching function is switched to said mode of transmitting said at least one paper sheet-formed information medium without said selecting information.

12. The document the information management system according to claim 1, wherein said remote terminal apparatus is a facsimile apparatus.

13. A document information management system, comprising:

an electronic file server storing a plurality of electronic source data files each including information related to a corresponding one of information components, each one of said plurality of said electronic source data files being linked with and accessed by said corresponding one of said plurality of said information components;

at least one paper sheet-formed information medium on which at least one document object including at least one of said plurality of said information components is pre-recorded, on which a hyper-text link including hyper-text link information for linking one of said plurality of said electronic source data files stored in said electronic file server with said corresponding one of said plurality of said information components is pre-recorded, and on which selecting information for selecting at least one of arbitrary information components from among said plurality of said information components included in said plurality of said document objects recorded on said at least one paper sheet-formed information medium is recorded;

a control terminal apparatus connected to said electronic file server and including a communication function for receiving and transmitting data and a retrieval function for retrieving a desired file from among said plurality of said electronic source data files stored in the electronic file server; and at least one remote terminal apparatus capable of reading data recorded on said at least one paper sheet-formed information medium, receiving data from and transmitting data to said control terminal apparatus, and producing a document that includes said data received from said control terminal apparatus on a paper recording sheet; and wherein, when said at least one remote terminal apparatus reads said recorded data of said at least one paper sheet-formed information medium and transmits said recorded data to said control terminal apparatus, said control terminal apparatus receives said recorded data of said at least one paper sheet-formed information medium, then retrieves a corresponding electronic source data file from among said plurality of said electronic source data files stored in said electronic file server by use of said selecting information and said hyper-text link information included in said recorded data which is sent from said at least one remote terminal apparatus, and then transmits said corresponding electronic source data file to said at least one remote terminal apparatus.

14. The document information management system according to claim 13, wherein said at least one remote terminal apparatus further includes a selector for selecting and for transmitting only said selecting information and said link information when said at least one remote terminal apparatus reads said recorded data of said at least one paper sheet-formed information medium and transmits said recorded data to said control terminal apparatus.

15. A document information management system, comprising:

an electronic file server storing a plurality of electronic source data files each including information related to a corresponding one of information components, each one of said plurality of said electronic source data files being linked with and accessed by said corresponding one of said plurality of said information components;

at least one paper sheet-formed information medium on which at least one document object including at least one of said plurality of said information components is pre-recorded, on which a hyper-text link including hyper-text link information for linking one of said plurality of said electronic source data files stored in said electronic file server with said corresponding one of said plurality of said information components is pre-recorded, and on which selecting information for selecting at least one of arbitrary information components from among said plurality of said information components included in said plurality of said document objects recorded on said at least one paper sheet-formed information medium is recorded;

a control terminal apparatus connected to said electronic file server and including a communication function for receiving and transmitting data, a retrieval function for retrieving a desired file from among said plurality of said electronic source data files stored in the electronic file server, and a user identification verifying function for storing a plurality of registered user names, for sending a user identification information request to said at least one remote terminal apparatus, and for verifying user identification information transmitted from said at least one remote terminal apparatus against said plurality of said registered user names; and at least one remote terminal apparatus capable of reading data recorded on said at least one paper sheet-formed information medium, receiving data from and transmitting data to said control terminal apparatus, producing a document that includes said data received from said control terminal apparatus on a paper recording sheet, and receiving an input for said user identification information entered by a user; and wherein, when said at least one remote terminal apparatus receives said input for said user identification information, reads said recorded data of said at least one paper sheet-formed information medium and transmits said input for said user identification information and said recorded data to said control terminal apparatus, said control terminal apparatus receives said input for said user identification information and said recorded data of said at least one paper sheet-formed information medium, retrieves a corresponding electronic source data file from among said plurality of said electronic source data files stored in said electronic file server by use of said input for said user identification information and said selecting information and said hyper-text link information included in said recorded data which is sent from said at least one remote terminal apparatus, and then transmits said corresponding electronic source data file to said at least one remote terminal apparatus.

16. The document information management system according to claim 15, wherein said recorded data of said paper sheet-formed information medium further includes said user identification information, and said user identification information verifying function performed by said control terminal apparatus verifies data of said input for said user identification information entered by said user against said user identification information included in said recorded data of said paper sheet-formed information medium.

17. The document information management system according to claim 15, wherein said electronic file server further stores said plurality of said registered user names, and said user identification information verifying function performed by said control terminal apparatus verifies data of said input for said user identification information entered by said user against data of said plurality of said registered user names stored in said electronic file server.

18. The document information management system according to claim 15, wherein said control terminal apparatus transmits said desired file retrieved from among said plurality of said electronic source data files stored in the electronic file server to said at least one remote terminal apparatus when said data of said input for said user identification information is matched by said user identification information verifying function performed by said control terminal apparatus, and said control terminal apparatus does not transmit data of said desired file retrieved from among said plurality of said electronic source data files stored in the electronic file server to said at least one remote terminal apparatus when said data of said input for said user identification information is not matched by said user identification information verifying function performed by said control terminal apparatus.

19. The document information management system according to claim 18, wherein said control terminal apparatus transmits information indicative of a matching error of said user identification information to said at least one remote terminal apparatus when said data of said input for said user identification information is not matched by said user identification information verifying function performed by said control terminal apparatus, and said at least one remote terminal apparatus indicates said matching error of said user identification information.

20. A document information management system comprising:

an electronic file server storing a plurality of electronic source data files each including information related to a corresponding one of information components, each one of said plurality of said electronic source data files being linked with and accessed by said corresponding one of said plurality of said information components;

at least one paper sheet-formed information medium on which at least one document object including at least one of said plurality of said information components is pre-recorded, on which a hyper-text link including hyper-text link information for linking one of said plurality of said electronic source data files stored in said electronic file server with said corresponding one of said plurality of said information components is pre-recorded, on which selecting information for selecting at least one of arbitrary information components from among said plurality of said information components included in said plurality of said document objects recorded on said at least one paper sheet-formed information medium is recorded, and on which a user identification information is recorded;

a control terminal apparatus connected to said electronic file server and including a communication function for receiving and transmitting data, a retrieval function for retrieving a desired file from among said plurality of said electronic source data files stored in the electronic file server, and a user identification verifying function for storing a plurality of registered user names, and for verifying user identification information recorded on said paper sheet-formed information medium against said plurality of registered user names; and at least one remote terminal apparatus capable of reading data recorded on said at least one paper sheet-formed information medium, receiving data from and transmitting data to said control terminal apparatus, and producing a document that includes said data received from said control terminal apparatus on a paper recording sheet; and wherein, when said at least one remote terminal apparatus reads said recorded data of said at least one paper sheet-formed information medium and transmits at least said user identification information, said selecting information, and said linking information to said control terminal apparatus, said control terminal apparatus receives at least said user identification information, said selecting information, and said hyper-text linking information, retrieves a corresponding electronic source data file from among said electronic plurality of said electronic source data files stored in said electronic file server by use of said user identification information and said selecting information and said link information included in said recorded data which is sent from said at least one remote terminal apparatus, and then transmits said corresponding electronic source data file to said at least one remote terminal apparatus.

21. The document information management system according to claim 20, wherein said control terminal apparatus transmits said desired file retrieved from among said plurality of said electronic source data files stored in the electronic file server to said at least one remote terminal apparatus when said transmitted data of said user identification information is matched by said user identification information verifying function performed by said control terminal apparatus, and said control terminal apparatus does not transmit data of said desired file retrieved from among said plurality of said electronic source data files stored in the electronic file server to said at least one remote terminal apparatus when said transmitted data of said user identification information is not matched by said user identification information verifying function performed by said control terminal apparatus.

22. A document information management system, comprising:
an electronic file server storing a plurality of electronic source data files each including information related to a corresponding one of information components, each one of said plurality of said electronic source data files being linked with and accessed by said corresponding one of said plurality of said information components;
at least one paper sheet-formed information medium on which at least one document object including at least one of said plurality of said information components is pre-recorded, on which a hyper-text link including hyper-text link information for linking one of said plurality of said electronic source data files stored in said electronic file server with said corresponding one of said plurality of said information components is pre-recorded, on which selecting information for selecting at least one of arbitrary information components from among said plurality of said information components included in said plurality of said document objects recorded on said at least one paper sheet-formed information medium is recorded, and on which identification information of said paper sheet-formed information medium is recorded;
a control terminal apparatus connected to said electronic file server and including a communication function for receiving and transmitting data and a retrieval function for retrieving a desired file from among said plurality of said electronic source data files stored in the electronic file server; and
at least one remote terminal apparatus capable of reading data recorded on said at least one paper sheet-formed information medium, receiving data from and transmitting data to said control terminal apparatus and producing a document that includes said data received from said control terminal apparatus on a paper recording sheet; and wherein said electronic file server further stores said recorded data of said at least one of said paper sheet-formed information medium including said selecting information, and, when said at least one remote terminal apparatus reads said recorded data of said at least one paper sheet-formed information medium and transmits at least said identification information of said paper sheet-formed information medium, said selecting information, and said hyper-text linking information included in said recorded data to said control terminal apparatus, said control terminal apparatus receives at least said identification information of said paper sheet-formed information medium, said selecting information, and said hyper-text linking information, then retrieves said recorded data of said at least one of said paper sheet-formed information medium including said selecting information and said corresponding electronic source data file from among said plurality of said electronic source data files stored in said electronic file server by use of said identification information of said paper sheet-formed information medium, said selecting information, and said hyper-text link information included in said recorded data which is sent from said at least one remote terminal apparatus, and then transmits said recorded data of said at least one of said paper sheet-formed information medium including said selecting information and said corresponding electronic source data file to said at least one remote terminal apparatus.

23. The document information management system according to claim 22, wherein said control terminal apparatus further includes a switching function for switching between modes of transmitting said document of said at least one paper sheet-formed information medium with said selecting information and transmitting said at least one paper sheet-formed information medium without said selecting information, said at least one remote terminal apparatus further includes an inputting function for receiving of an input of selecting said modes entered by a user and transmitting said input to said control terminal apparatus, said switching function operating in accordance with said input transmitted from said at least one remote terminal apparatus, and said control terminal apparatus transmits said at least one paper sheet-formed information medium without said selecting information to said at least one remote terminal apparatus when said switching function is switched to said mode of transmitting of said at least one paper sheet-formed information medium without said selecting information.

24. The document information management system according to claim 13, wherein said remote terminal apparatus is a facsimile apparatus.

25. A document information management method for a document information management system including at least one paper sheet-formed information medium on which at least one document object including at least one of a plurality of information components is pre-recorded, on which a hyper-text link including hyper-text link information for linking one of a plurality of electronic source data files stored in an electronic file server with a corresponding one of said plurality of said information components is pre-recorded, and on which selecting information for selecting at least one of arbitrary information components from among said plurality of said information components included in said plurality of said document objects recorded on said at least one paper sheet-formed information medium is recorded, a control terminal apparatus connected to said electronic file server and including a communication function for receiving and transmitting data and a retrieval function for retrieving a desired file from among said plurality of said electronic source data files stored in the electronic file server, and at least one remote terminal apparatus capable of reading data recorded on said at least one paper sheet-formed information medium, receiving data from and transmitting data to said control terminal apparatus, and producing a document that includes said data received from said control terminal apparatus on a paper recording sheet, comprising the steps of:

storing, into an electronic file server, a plurality of electronic source data files each including information related to a corresponding one of information components, each one of said plurality of said electronic source data files being linked with and accessed by said corresponding one of said plurality of said information components;

initiating said at least one remote terminal apparatus to read said recorded data of said at least one paper sheet-formed information medium and to transmit said recorded data to said control terminal apparatus;

receiving said recorded data of said at least one paper sheet-formed information medium at said control terminal apparatus;

retrieving a corresponding electronic source data file from among said plurality of said electronic source data files stored in said electronic file server by use of said selecting information and said hyper-text link information included in said recorded data which is sent from said at least one remote terminal apparatus; and transmitting said corresponding electronic source data file to said at least one remote terminal apparatus.

26. The document information management system according to claim 25, wherein said step of initiating said at least one remote terminal apparatus includes the step of initiating said at least one remote terminal apparatus to read said recorded data of said at least one paper sheet-formed information medium, to select information and said link information when said at least one remote terminal apparatus reads said recorded data of said at least one paper sheet-formed information medium, and to transmit said recorded data to said control terminal apparatus.

27. A document information management method for a document information management system including at least one paper sheet-formed information medium on which at least one document object including at least one of a plurality of information components is pre-recorded, on which a hyper-text link including hyper-text link information for linking one of a plurality of said electronic source data files stored in an electronic file server with a corresponding one of said plurality of said information components is pre-recorded, and on which selecting information for selecting at least one of arbitrary information components from among said plurality of said information components included in said plurality of said document objects recorded on said at least one paper sheet-formed information medium is recorded, a control terminal apparatus connected to said electronic file server and including a communication function for receiving and transmitting data, a retrieval function for retrieving a desired file from among said plurality of said electronic source data files stored in the electronic file server, and a user identification verifying function for storing a plurality of registered user names, for sending a user identification information request to said at least one remote terminal apparatus, and for verifying user identification information transmitted from said at least one remote terminal apparatus against said plurality of said registered user names, and at least one remote terminal apparatus capable of reading data recorded on said at least one paper sheet-formed information medium, receiving data from and transmitting data to said control terminal apparatus, producing a document that includes said data received from said control terminal apparatus on a paper recording sheet, and receiving an input for said user identification information entered by a user, comprising the steps of:

storing, into an electronic file server, a plurality of electronic source data files each including information related to a corresponding one of information components, each one of said plurality of said electronic source data files being linked with and accessed by said corresponding one of said plurality of said information components;

initiating said at least one remote terminal apparatus to receive said input for said user identification information, to read said recorded data of said at least one paper sheet-formed information medium and to transmit said input for said user identification information and said recorded data to said control terminal apparatus;

receiving said input for said user identification information and said recorded data of said at least one paper sheet-formed information medium at said control terminal apparatus;

retrieving a corresponding electronic source data file from among said plurality of said electronic source data files stored in said electronic file server by use of said input for said user identification information and said selecting information and said hyper-text link information included in said recorded data which is sent from said at least one remote terminal apparatus; and transmitting said corresponding electronic source data file to said at least one remote terminal apparatus.

28. The document information management method according to claim 27, wherein said recorded data of said sheet-formed information medium further includes said paper user identification information, and further comprising a step of verifying data of said input for said user identification information entered by said user against said user identification information included in said recorded data of said paper sheet-formed information medium.

29. The document information management method according to claim 27, wherein said step of storing, into said electronic file server, further includes a step of storing said plurality of said registered user names, and further comprising the step of verifying data of said input for said user identification information entered by said user against data of said plurality of said registered user names stored in said electronic file server.

30. The document information management method according to claim 27, further comprising a step of verifying data of said input for said user identification information entered by said user, and during said transmitting step, said desired file retrieved from among said plurality of said electronic source data files stored in the electronic file server is transmitted to said at least one remote terminal apparatus when said data of said input for said user identification information is matched by said verifying step, and no data of said desired file retrieved from among said plurality of said electronic source data files stored in the electronic file server is transmitted to said at least one remote terminal apparatus when said data of said input for said user identification information is not matched by said verifying step.

31. The document information management method according to claim 30, further comprising the steps of:

transmitting information indicative of a matching error of said user identification information to said at least one remote terminal apparatus when said data of said input for said user identification information is not matched by said user identification information verifying function performed by said control terminal apparatus; and indicating said matching error of said user identification information at said at least one remote terminal apparatus.

32. A document information management system method for a document information management system including at least one paper sheet-formed information medium on which at least one document object including at least one of a plurality of information components is pre-recorded, on which a hyper-text link including hyper-text link information for linking one of a plurality of said electronic source data files stored in an electronic file server with a corresponding one of said plurality of said information components is pre-recorded, on which selecting information for selecting at least one of arbitrary information components from among said plurality of said information components included in said plurality of said document objects recorded on said at least one paper sheet-formed information medium is recorded, and on which a user identification information is recorded, a control terminal apparatus connected to said electronic file server and including a communication function for receiving and transmitting data, a retrieval function for retrieving a desired file from among said plurality of said electronic source data files stored in the electronic file server and a user identification verifying function for storing a plurality of registered user names, and for verifying user identification information recorded on said paper sheet-formed information medium against said plurality of said registered user names, and at least one remote terminal apparatus capable of reading data recorded on said at least one paper sheet-formed information medium, receiving data from and transmitting data to said control terminal apparatus, and producing a document that includes said data received from said control terminal apparatus on a paper recording sheet, comprising the steps of:

storing, into an electronic file server, a plurality of electronic source data files each including information related to a corresponding one of information components, each one of said plurality of said electronic source data files being linked with and accessed by said corresponding one of said plurality of said information components;

initiating said at least one remote terminal apparatus to read said recorded data of said at least one paper sheet-formed information medium and to transmit at least said user identification information, said selecting information, and said hyper-text linking information to said control terminal apparatus, said control terminal apparatus receives at least said user identification information, said selecting information, and said hyper-text linking information;

retrieving a corresponding electronic source data file from among said plurality of said electronic source data files stored in said electronic file server by use of said user identification information and said selecting information and said hyper-text link information included in said recorded data which is sent from said at least one remote terminal apparatus; and transmitting said corresponding electronic source data file to said at least one remote terminal apparatus.

33. The document information management method according to claim 32, further comprising a step of verifying said transmitted data of said user identification information, and, during said transmitting step, said desired file retrieved from among said plurality of said electronic source data files stored in the electronic file server is transmitted to said at least one remote terminal apparatus when said transmitted data of said user identification information is matched by said verifying step, and no data of said desired file retrieved from among said plurality of said electronic source data files stored in the electronic file server is transmitted to said at least one remote terminal apparatus when said transmitted data of said user identification information is not matched by said verifying step.

34. A document information management method for a document information management system including at least one paper sheet-formed information medium on which at least one document object including at least one of a plurality of information components is pre-recorded, on which a hyper-text link including hyper-text link information for linking one of a plurality of electronic source data files stored in an electronic file server with a corresponding one of said plurality of said information components is pre-recorded, on which selecting information for selecting at least one of arbitrary information components from among said plurality of said information components included in said plurality of said document objects recorded on said at least one paper sheet-formed information medium is recorded, and on which identification information of said paper sheet-formed information medium is recorded, a control terminal apparatus connected to said electronic file server and including a communication function for receiving and transmitting data and a retrieval function for retrieving a desired file from among said plurality of said electronic source data files stored in the electronic file server, and at least one remote terminal apparatus capable of reading data recorded on said at least one paper sheet-formed information medium, receiving data from and transmitting data to said control terminal apparatus, and producing a document that includes said data received from said control terminal apparatus on a paper recording sheet, comprising the steps of:

storing, into an electronic file server, a plurality of electronic source data files each including information related to a corresponding one of information components, each one of said plurality of said electronic source data files being linked with and accessed by said corresponding one of said plurality of said information components, and wherein during the storing step, said recorded data of said at least one of said paper sheet-formed information medium including said selecting information is further stored in said electronic file server;

initiating said at least one remote terminal apparatus to read said recorded data of said at least one paper sheet-formed information medium and to transmit at least said identification information of said paper sheet-formed information medium, said selecting information, and said hyper-text linking information included in said recorded data to said control terminal apparatus;

receiving at least said identification information of said paper sheet-formed information medium, said selecting information, and said hyper-text linking information at said control terminal apparatus;

retrieving said recorded data of said at least one of said paper sheet-formed information medium including said selecting information and said corresponding electronic source data file from among said plurality of said electronic source data files stored in said electronic file server by use of said identification information of said paper sheet-formed information medium, said selecting information, and said hyper-text link information included in said recorded data which is sent from said at least one remote terminal apparatus;

transmitting said recorded data of said at least one of said paper sheet-formed information medium including said selecting information and said corresponding electronic source data file to said at least one remote terminal apparatus.

35. The document information management system according to claim 34, wherein said document information management system further includes a step of switching between modes of transmitting said at least one paper sheet-formed information medium with said selecting information and transmitting said at least one paper sheet-formed information medium without said selecting information, said at least one remote terminal apparatus further includes an inputting function for receiving an input of selecting said modes entered by a user and transmitting said input to said control terminal apparatus, said switching function operating in accordance with said input transmitted from said at least one remote terminal apparatus, and, during said transmitting step, said at least paper one paper sheet-formed information medium without said selecting information is transmitted to said at least one remote terminal apparatus when said mode of transmitting said at least one paper sheet-formed information medium without said selecting information is set during said switching step.

36. The document information management system according to claim 25, wherein said remote terminal apparatus is a facsimile apparatus.

* * * * *